US010631060B2

(12) United States Patent
Oguchi et al.

(10) Patent No.: US 10,631,060 B2
(45) Date of Patent: Apr. 21, 2020

(54) VIDEO IMAGE REPRODUCTION DEVICE, VIDEO IMAGE DISTRIBUTION SERVER, METHOD OF REPRODUCING VIDEO IMAGE AND METHOD OF DISTRIBUTING VIDEO IMAGE

(71) Applicant: RUN.EDGE LIMITED, Tokyo (JP)

(72) Inventors: Atsushi Oguchi, Kawasaki (JP); Shunsuke Kobayashi, Fukuoka (JP)

(73) Assignee: RUN.EDGE LIMITED, Tokyo (JP)

( * ) Notice: Subject to any disclaimer, the term of this patent is extended or adjusted under 35 U.S.C. 154(b) by 0 days.

(21) Appl. No.: 15/695,787

(22) Filed: Sep. 5, 2017

(65) Prior Publication Data

US 2017/0366864 A1   Dec. 21, 2017

Related U.S. Application Data

(62) Division of application No. 15/240,641, filed on Aug. 18, 2016.

(30) Foreign Application Priority Data

Sep. 29, 2015 (JP) ................................. 2015-192063

(51) Int. Cl.
*H04N 21/482* (2011.01)
*H04N 21/647* (2011.01)
(Continued)

(52) U.S. Cl.
CPC ....... *H04N 21/4828* (2013.01); *H04N 21/232* (2013.01); *H04N 21/23106* (2013.01);
(Continued)

(58) Field of Classification Search
CPC ....... H04N 21/23106; H04N 21/23109; H04N 21/232; H04N 21/26258; H04N 21/278;
(Continued)

(56) References Cited

U.S. PATENT DOCUMENTS 7,467,131 B1 * 12/2008 Gharachorloo ... G06F 17/30902
8,578,261 B1 * 11/2013 Gupta .................... G06F 16/957
715/208

(Continued)

FOREIGN PATENT DOCUMENTS

JP   2003-167813 A   6/2003
JP   2012-43466 A    3/2012
(Continued)

OTHER PUBLICATIONS

Office Action dated May 8, 2017, issued in counterpart Taiwanese Patent Application No. 105126769, with English translation. (14 pages).

(Continued)

*Primary Examiner* — Jeremy S Duffield
(74) *Attorney, Agent, or Firm* — Westerman, Hattori, Daniels & Adrian, LLP

(57) ABSTRACT

A video image reproduction device transmits a search request in accordance with a search condition of video image data to an external device, generates window data in accordance with the search result when a response including the search result identifying a plurality of pieces of video image data in accordance with the search request is received from the external device, and obtains divisional files corresponding to reproduction starting portions in the plurality of respective pieces of video image data identified by the search result. Further, the video image reproduction device starts, when receiving a reproduction instruction for one of the plurality of pieces of video image data after displaying a window based on the window data, reproduction of a divisional file of the video image data for which the reproduction instruction has been received from among the plurality of obtained divisional files.

5 Claims, 27 Drawing Sheets

(51) Int. Cl.
| | |
|---|---|
| *H04N 21/232* | (2011.01) |
| *H04N 21/231* | (2011.01) |
| *H04N 21/278* | (2011.01) |
| *H04N 21/472* | (2011.01) |
| *H04N 21/81* | (2011.01) |
| *H04N 21/845* | (2011.01) |
| *H04N 21/262* | (2011.01) |
| *H04N 21/431* | (2011.01) |
| *H04N 21/84* | (2011.01) |
| *H04L 29/06* | (2006.01) |

(52) U.S. Cl.
CPC . *H04N 21/23109* (2013.01); *H04N 21/26258* (2013.01); *H04N 21/278* (2013.01); *H04N 21/4316* (2013.01); *H04N 21/472* (2013.01); *H04N 21/4825* (2013.01); *H04N 21/64738* (2013.01); *H04N 21/8153* (2013.01); *H04N 21/84* (2013.01); *H04N 21/8456* (2013.01); *H04L 65/40* (2013.01)

(58) Field of Classification Search
CPC ............. H04N 21/4316; H04N 21/472; H04N 21/4825; H04N 21/4828; H04N 21/8153; H04N 21/8456; G06F 17/3084; G06F 17/30864
See application file for complete search history.

(56) References Cited

U.S. PATENT DOCUMENTS

| | | | |
|---|---|---|---|
| 8,942,542 B1 | 1/2015 | Sherrets et al. | |
| 9,848,228 B1 | 12/2017 | Morris et al. | |
| 2007/0067795 A1 | 3/2007 | Suzuki et al. | |
| 2009/0182726 A1* | 7/2009 | Wang | G06F 17/30979 |
| 2009/0327236 A1* | 12/2009 | Denney | G06F 17/3064 |
| 2010/0239016 A1 | 9/2010 | Desimone et al. | |
| 2012/0259994 A1 | 10/2012 | Gillies et al. | |
| 2013/0103849 A1 | 4/2013 | Mao et al. | |
| 2013/0159923 A1* | 6/2013 | French | G06F 17/30899 715/790 |
| 2013/0227629 A1 | 8/2013 | Yoshizawa et al. | |
| 2013/0262458 A1 | 10/2013 | Saito et al. | |
| 2014/0258861 A1* | 9/2014 | Baldwin | H04N 21/812 715/716 |
| 2014/0282792 A1* | 9/2014 | Bao | H04N 21/4404 725/116 |
| 2015/0063781 A1 | 3/2015 | Silverman et al. | |
| 2015/0271440 A1 | 9/2015 | Oryoji et al. | |
| 2015/0334204 A1 | 11/2015 | Bilinski et al. | |

FOREIGN PATENT DOCUMENTS

| | | |
|---|---|---|
| JP | 2012-80417 A | 4/2012 |
| JP | 2013-89977 | 5/2013 |
| JP | 2013-175849 A | 9/2013 |
| JP | 2013-210721 A | 10/2013 |
| JP | 2014-517558 A | 7/2014 |
| JP | 2014-175687 A | 9/2014 |
| JP | 2015-501090 A | 1/2015 |
| JP | 2015-80164 A | 4/2015 |
| KR | 10-2007-0032894 A | 3/2007 |
| KR | 10-2015-0064613 A | 6/2015 |
| TW | 201108124 A1 | 3/2011 |
| WO | 2014/065165 A1 | 5/2014 |

OTHER PUBLICATIONS

Non-Final Office Action dated Nov. 16, 2017, issued in U.S. Appl. No. 15/240,641. (20 pages).

Office Action dated Sep. 12, 2017, issued in counterpart Korean Application No. 10-2016-0120820, with partial English translation (10 pages).

Final Office Action dated Jun. 29, 2018, issued in U.S. Appl. No. 15/240,641. (15 pages).

Non-Final Office Action dated Jan. 18, 2019, issued in U.S. Appl. No. 15/240,641. (19 pages).

Office Action dated Feb. 26, 2019, issued in counterpart JP Application No. 2015-192063, with English machine translation. (11 pages).

\* cited by examiner

| SEGMENT NUMBER | URL | TIME OF DAY OF HEAD |
|---|---|---|
| 0-0 | ****/***_0-0.ts | 0:00:00 |
| 0-1 | ****/***_0-1.ts | 0:02:00 |
| 0-2 | ****/***_0-2.ts | 0:04:00 |
| 0-3 | ****/***_0-3.ts | 0:06:00 |
| 0-4 | ****/***_0-4.ts | 0:08:00 |
| 1 | ****/***_1.ts | 0:10:00 |
| 2 | ****/***_2.ts | 0:20:00 |
| 3-0 | ****/***_3-0.ts | 0:30:00 |
| 3-1 | ****/***_3-1.ts | 0:32:00 |
| 3-2 | ****/***_3-2.ts | 0:34:00 |
| 3-3 | ****/***_3-3.ts | 0:36:00 |
| 3-4 | ****/***_3-4.ts | 0:38:00 |
| 4 | ****/***_4.ts | 0:40:00 |
| ⋮ | ⋮ | ⋮ |

251

F I G. 5

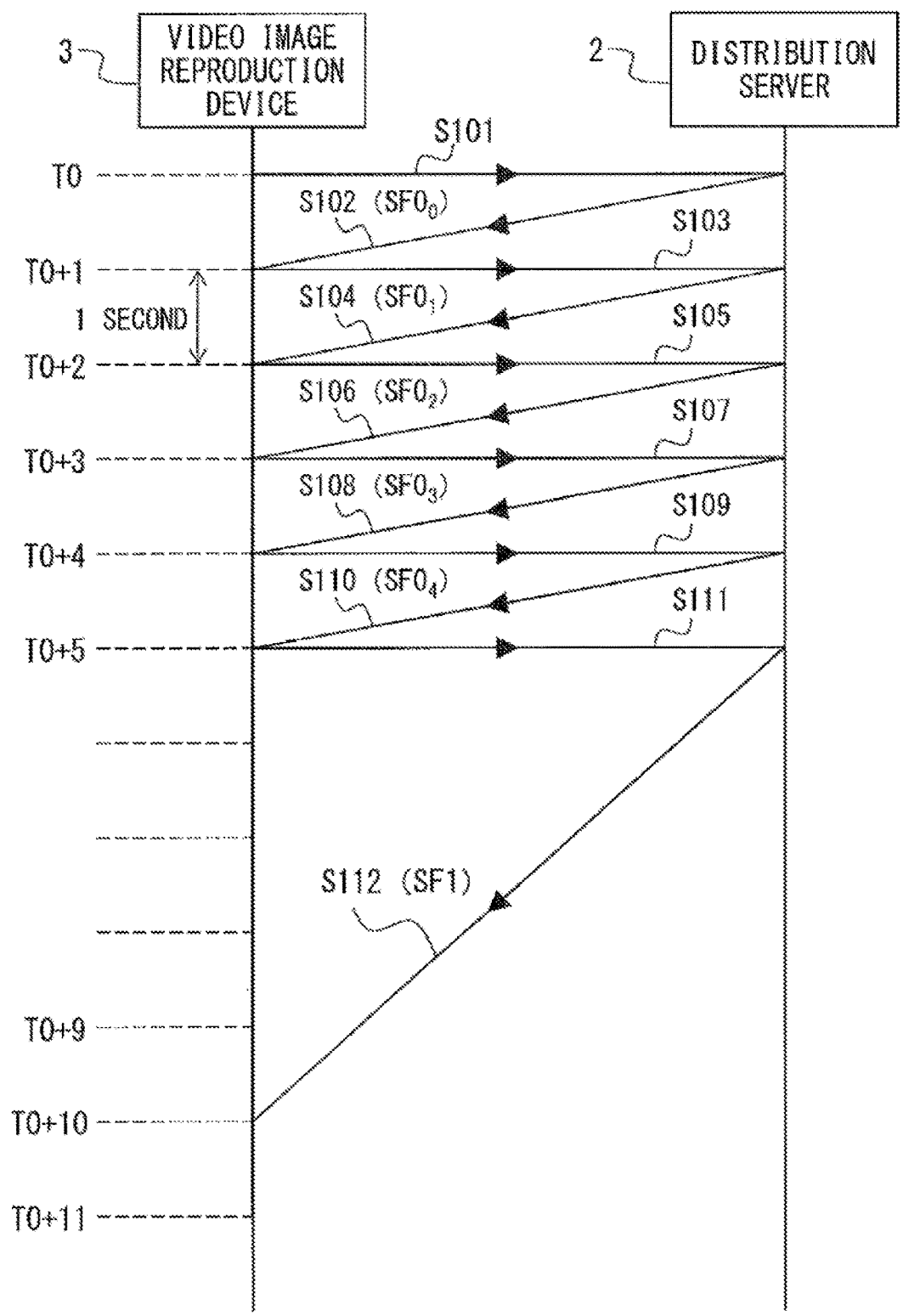
F I G. 6

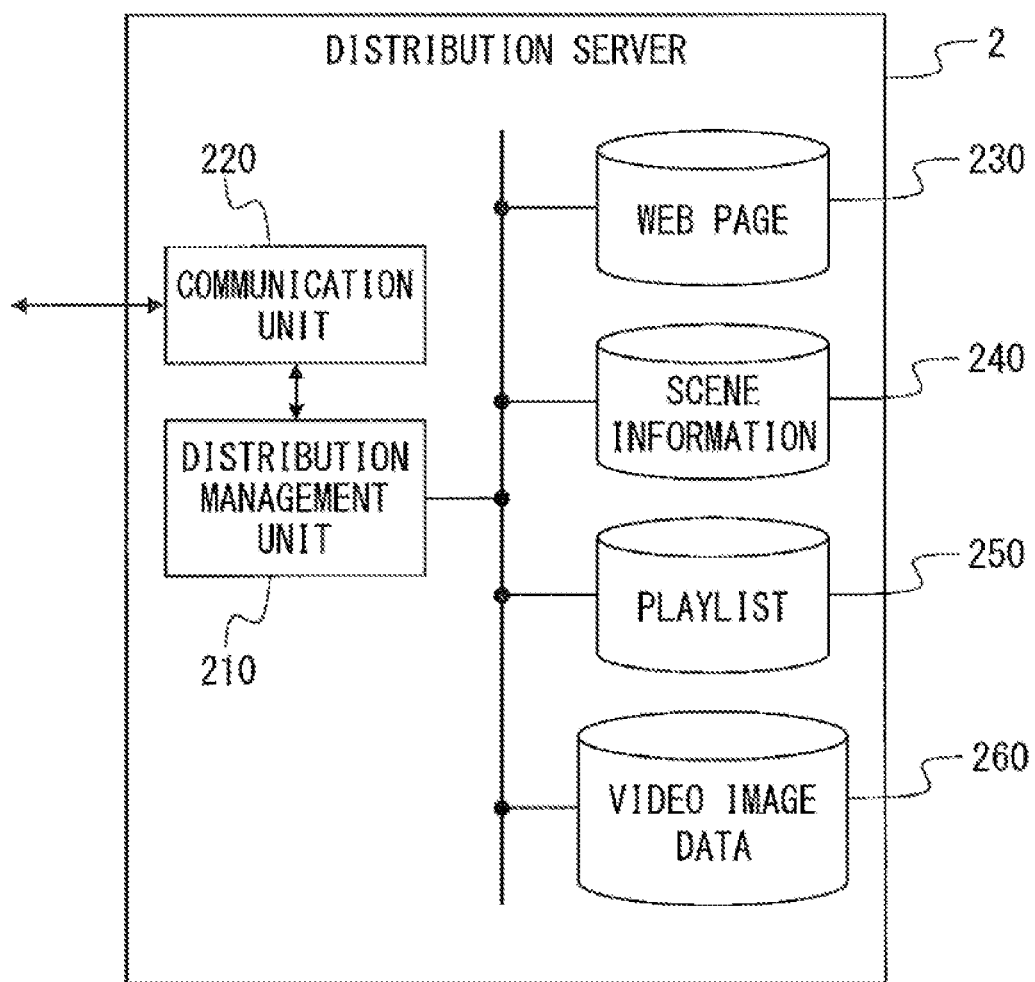
F I G. 7

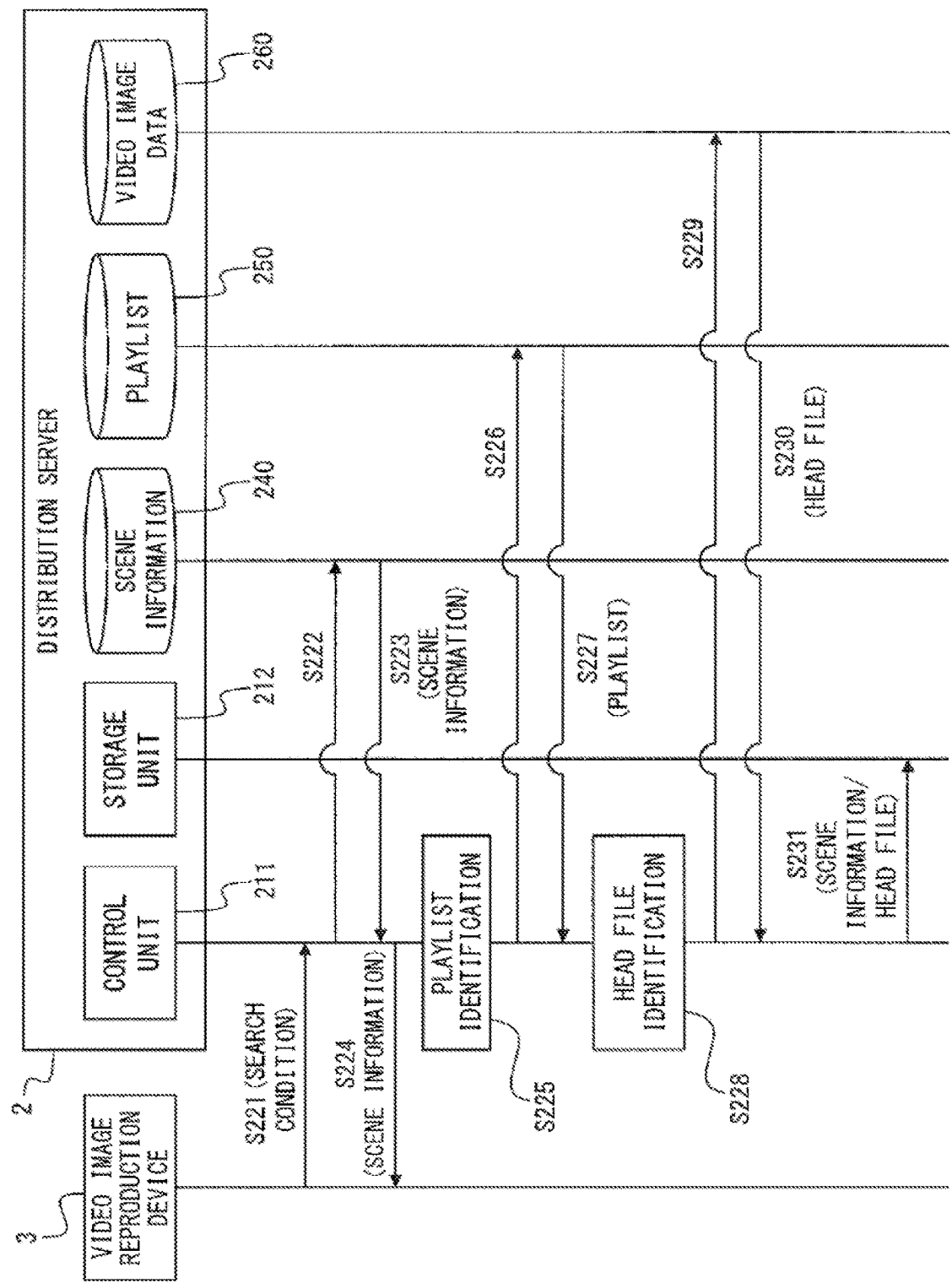

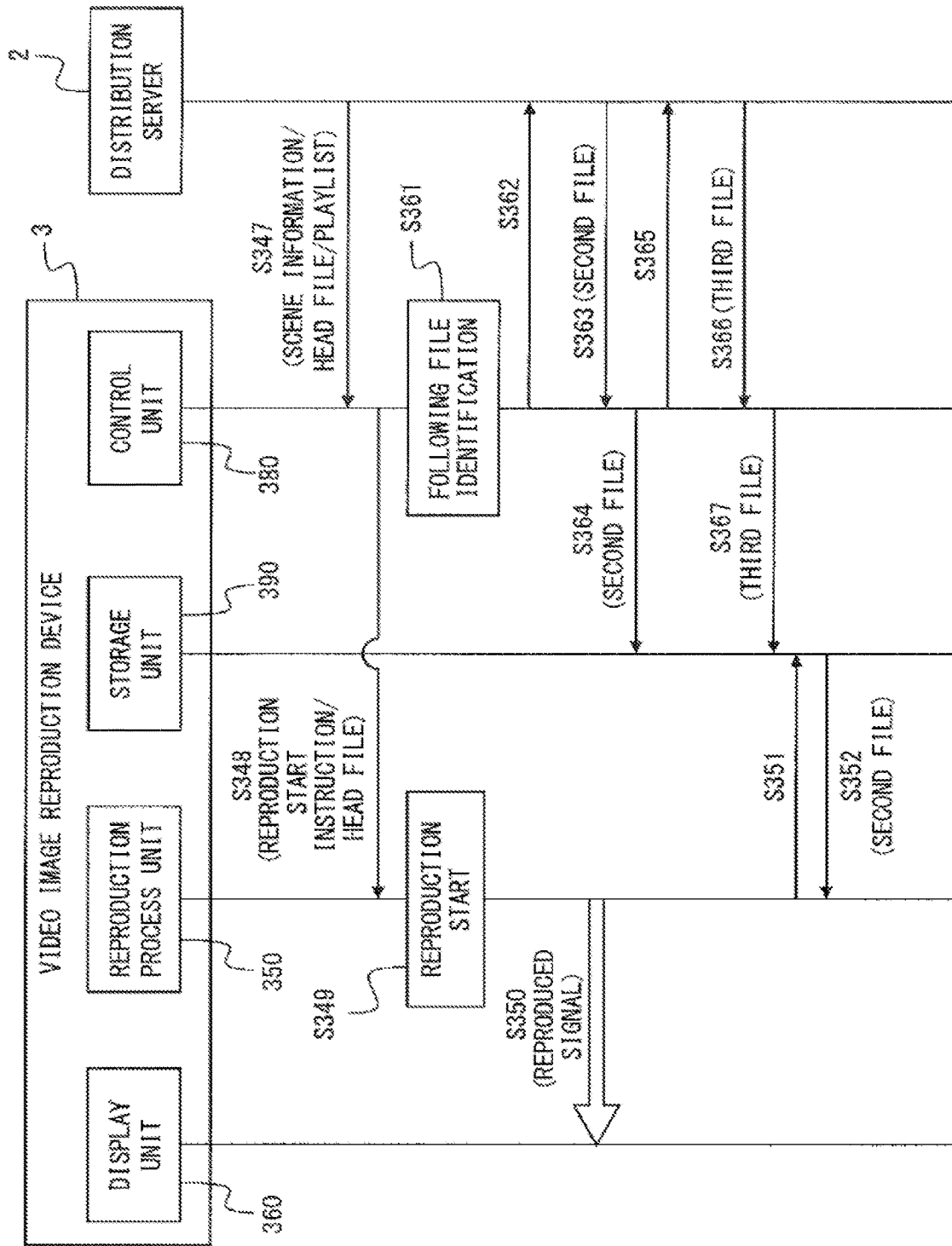
F I G. 24B

VIDEO IMAGE REPRODUCTION DEVICE, VIDEO IMAGE DISTRIBUTION SERVER, METHOD OF REPRODUCING VIDEO IMAGE AND METHOD OF DISTRIBUTING VIDEO IMAGE

CROSS-REFERENCE TO RELATED APPLICATION

This application is a Divisional of application Ser. No. 15/240,641, filed on Aug. 18, 2016, which is based upon and claims the benefit of priority of the prior Japanese Patent Application No. 2015-192063, filed on Sep. 29, 2015, the entire contents of which are incorporated herein by reference.

FIELD

The embodiments discussed herein are related to a video image reproduction device.

BACKGROUND

Streaming distribution is a method for distributing video images via a communication network such as the Internet etc. In streaming distribution, one piece of video image data is divided into a plurality of segment files (divisional files) and the files are sequentially distributed to video image reproduction devices (clients) that reproduce the image data. Video image reproduction devices sequentially reproduce the received segment files on a time-series basis.

Streaming distribution is categorized roughly into a distribution scheme that uses a dedicated protocol such as Real-Time Streaming Protocol (RTSP) etc. and a distribution scheme that uses Hypertext Transfer Protocol (HTTP).

Streaming distribution using HTTP realizes the distribution of video images etc. by using a web server alone. Also, streaming distribution using HTTP permits the use of caches, leading to reduced loads on the distribution server (web server). Accordingly, streaming distribution services using HTTP have been drawing attention and increasing in recent years.

Examples of standards for streaming distribution that uses HTTP include HTTP Live Stream (HLS) (see Document 1 for example), MPEG-Dynamic Adaptive Streaming over HTTP (MPEG-DASH), etc.

Document 1: Japanese Laid-open Patent Publication No. 2013-089977

SUMMARY

According to an aspect of the embodiment, a video image reproduction device includes: a memory configured to store video image data and a search result of video image data; and a processor configured to: receive specifying of a search condition of the video image data, transmit a search request in accordance with the received search condition to an external device, generate window data in accordance with the search result when a response including the search result identifying a plurality of pieces of video image data in accordance with the search request is received from the external device, obtain one or a plurality of divisional files corresponding to reproduction starting portions in the plurality of respective pieces of video image data identified by the search result, and make the memory store the divisional files; read from the memory, when receiving a reproduction instruction for one of the plurality of pieces of video image data after displaying a window based on the window data, a divisional file of the video image data for which the reproduction instruction has been received; and start reproduction of the read divisional file.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF DRAWINGS

FIG. 5 illustrates a configuration example of a playlist;

FIG. 6 is a sequence diagram for explaining a method of distributing video image data;

FIG. 7 illustrates a functional configuration of a distribution server in a video image distribution system according to a first embodiment;

FIG. 19 illustrates an example of search results of games that a particular player is appearing in;

FIG. 23 is a sequence diagram for explaining a search process in the video image distribution system according to the second embodiment;

FIG. 24B is a sequence diagram for explaining a reproduction process of a video image in the distribution system according to the second embodiment (second)

DESCRIPTION OF EMBODIMENTS

In the above streaming distribution, a video image reproduction device completes the reception of the first segment file of the video image data or a segment file including the first frame for a specified scene, and thereafter starts the reproduction. This results in a waiting time of several seconds in the video image reproduction device between the reception of an operator's manipulation of selecting video image data or a scene for which the distribution is desired and the start of the reproduction.

When video image data is to be divided into a plurality of segment files, it is divided for example at intervals of a prescribed time length, starting from the head of the video image data. According to HLS, MPEG-DASH, etc., video image data is divided into segment files, each having a time length (reproduction time) of for example around 10 seconds.

When the reproduction time of one segment file is 10 seconds and the transfer time of a segment file is twice the reproduction rate, the transfer time of a segment file is 5 seconds. Thus, the waiting time in a video image reproduction device is 5 seconds. Reduction in the time length (reproduction time) of each segment file reduces this waiting time, whereas this increases the number of segment files, also increasing the number of times of communications between the video image reproduction device and the distribution server. This means that the loads on the distribution server increase in response to the reduction in the time length of a segment file.

Preferred embodiments of the present invention will be explained with reference to accompanying drawings.

Figure 1:
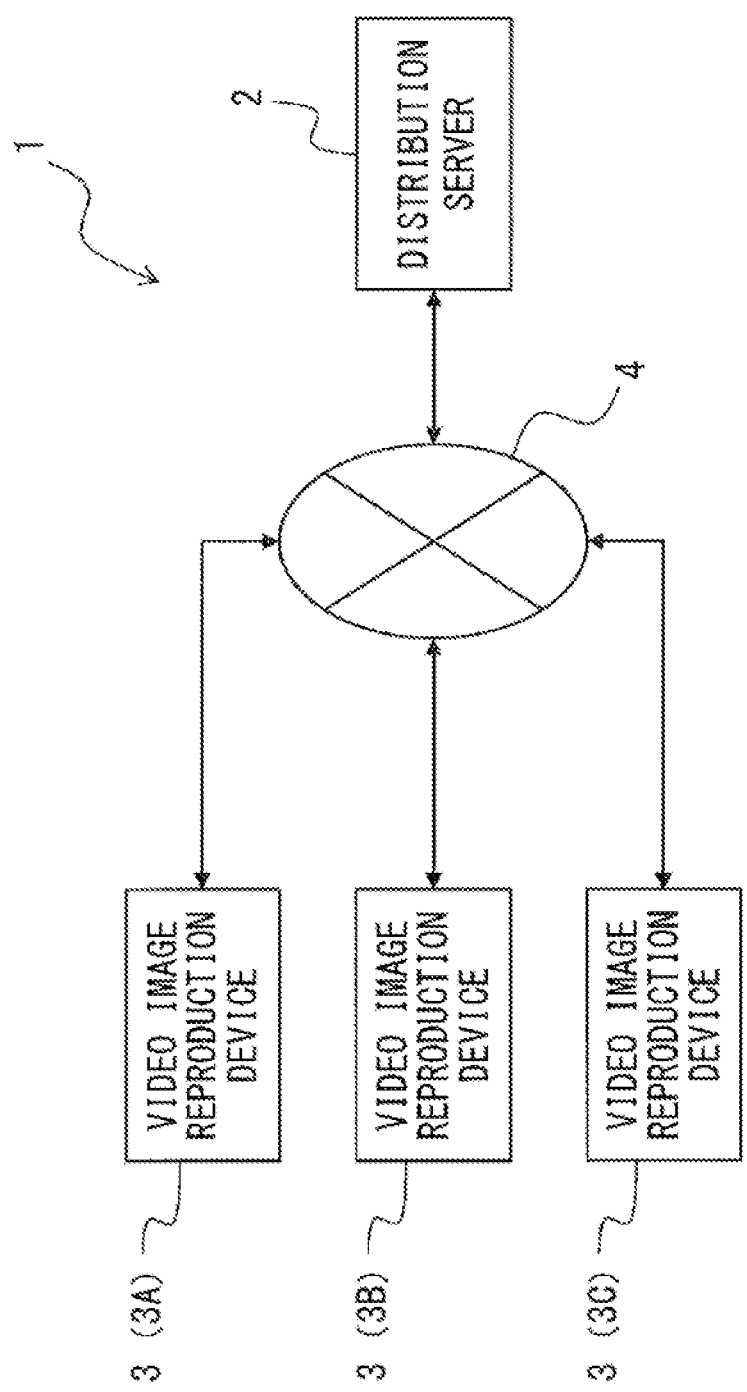
FIG. 1 illustrates a configuration example of a video image distribution system.

FIG. 1 illustrates a configuration example of a video image distribution system.

As illustrated in FIG. 1, a video image distribution system 1 includes a distribution server 2 and a plurality of video image reproduction devices (clients) 3. The plurality of video image reproduction devices 3 (3A, 3B and 3C) are connected to the distribution server 2 via a communication network 4 such as the Internet etc.

The distribution server 2 holds a plurality of types of video image data and a playlist of each of the pieces of video image data. The video image reproduction device 3 obtains desired video image data from the distribution server 2 (external device) via the communication network 4 and reproduces the obtained video image data.

The video image distribution system 1 supports streaming distribution that uses HTTP such as for example HLS, HTTP Dynamic Streaming (HDS) etc.

The distribution server 2 divides one piece of video image data (original image data) picked up by using an image pickup device such as a video camera etc. into a plurality of files, and holds those files. In the explanations below, a divisional file of video image data is referred to as a segment file. Also, in the explanations below, a set of a plurality of segment files included in one piece of video image data is referred to as a segment file group. The correspondence relationship between the file name of each segment file and the reproduction time of day in the video image in one segment file group is registered in a playlist. A segment file group and a playlist are generated by for example using a generation device (not illustrated) provided separately from the distribution server 2.

The distribution server 2 distributes (transmits), in units of segment files, video image data requested by the video image reproduction devices 3 to the video image reproduction devices 3. The video image distribution system 1 exemplified in this specification stores for example a segment file group as illustrated in FIG. 2 in the distribution server 2 in order to reduce a waiting time between when the video image reproduction device 3 makes a request for the distribution of video image data and when the video image data begins to be reproduced.

Figure 2:
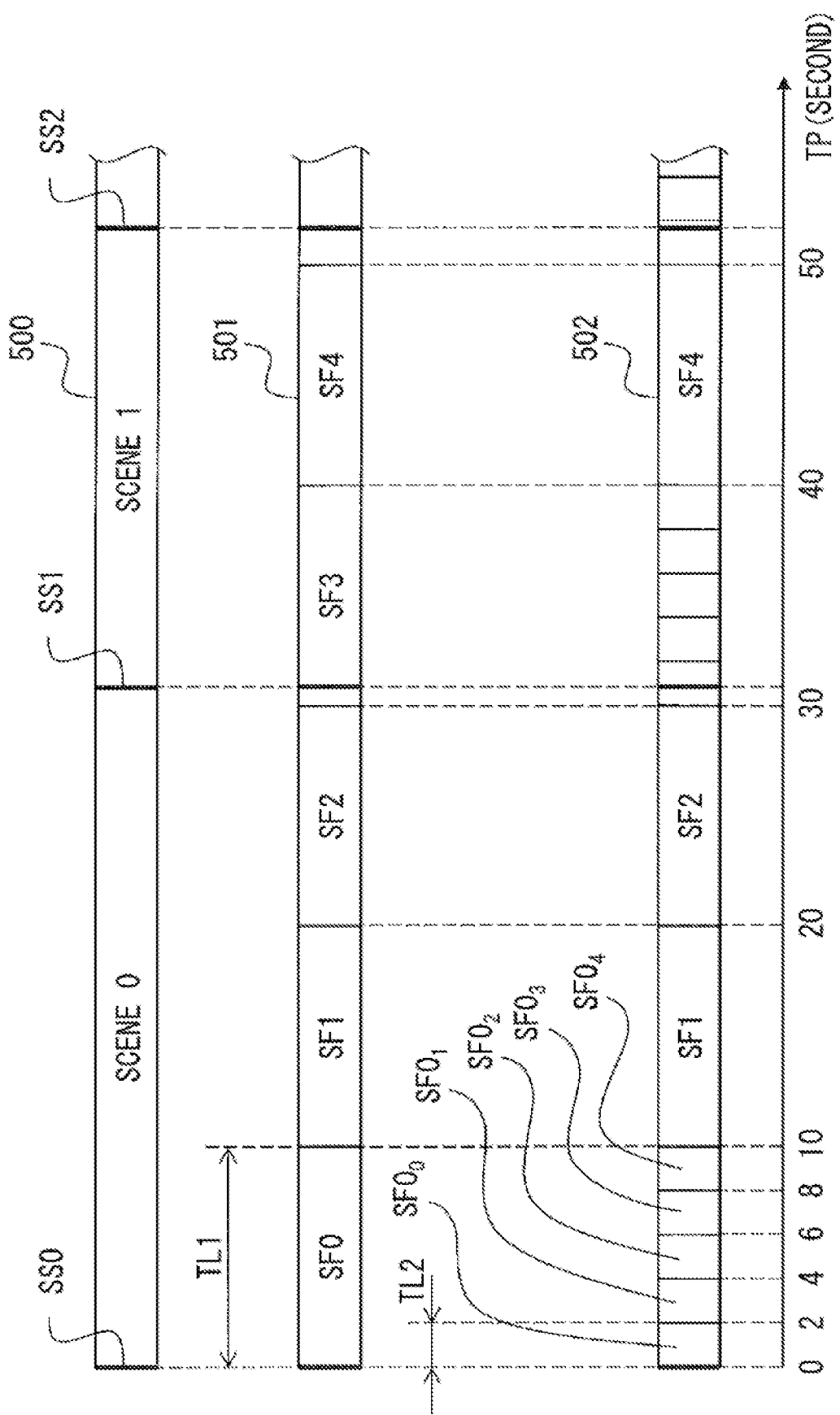
FIG. 2 illustrates an example of a method of generating a segment file group.

FIG. 2 illustrates an example of a method of generating a segment file group.

As illustrated in FIG. 2, a generation device for generating a segment file group from video image data first conducts scene setting for original image data 500 obtained from an image pickup device, and extracts frames (SS0, SS1, SS22, . . . ) that correspond to the heads of the respective scenes. Scene setting may be conducted by using any one of known setting methods. For example, the operator may set a scene manually, or may set a scene automatically by executing a known scene detection program.

Next, the generation device generates a first segment file group 501 obtained by dividing the original data 500 into segment files (SF0, SF1, SF2, SF3, SF4, . . . ), each having first time length TL1. First time length TL1 is the length of a reproduction time of one segment file based on time-of-day information in the original image data 500. This first time length TL1 suppresses an increase in the process loads that is caused by an increase in the transfer frequency of segment files to the video image reproduction devices 3 from the distribution server 2, and is set as a time length (10 seconds for example) that can suppress an increase in the waiting time in the video image reproduction device 3.

Next, the generation device redivides a segment file including the frame of the head of a scene among the respective segment files in the first segment file group 501 into a plurality of segment files, each having second time length TL2, and generates a second segment file group 502. In the first segment file group 501 illustrated in FIG. 2, segment file SF0, which is the first segment file, segment file SF3, which is the fourth segment file, and the sixth segment file include the heads of scenes. Accordingly, the generation device redivides the first segment file SF0, the fourth segment file SF3, the sixth segment file, etc. in the first segment file group 501 into segment files each having second time length TL2.

The relationship between first time length TL1 and second time length TL2 is arbitrary, and second time length TL2 is ⅕ of first time length TL1 in the example illustrated in FIG. 2. Accordingly, the first segment file SF0 in the first segment file group 501 for example is divided into five segment files ($SF0_0$, $SF0_1$, $SF0_2$, $SF0_3$ and $SF0_4$) each having second time length TL2.

Figure 3:
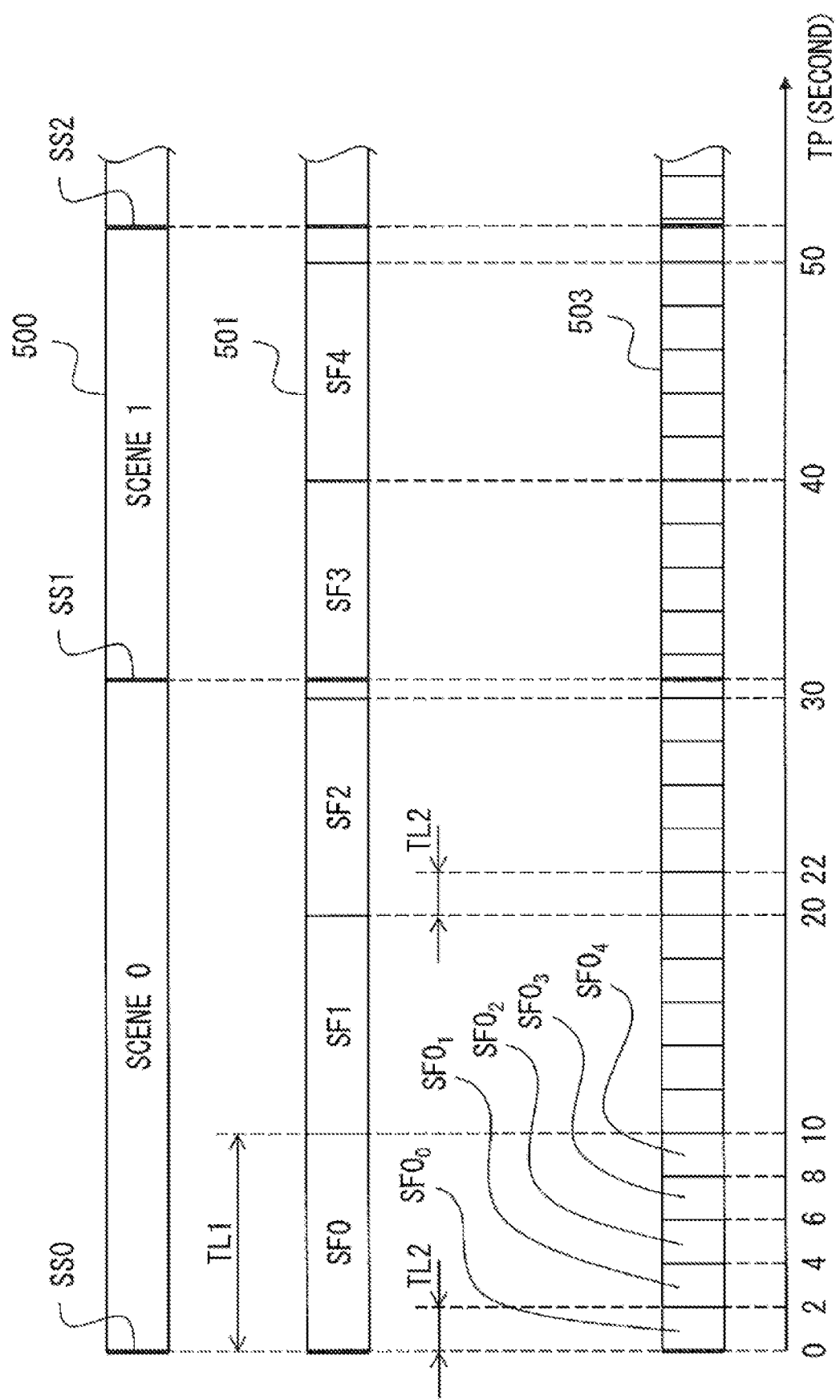
FIG. 3 illustrates a different example of a method of generating a segment file group.

A segment file group may also be generated by using a method illustrated in FIG. 3 in addition to the method illustrated in FIG. 2.

FIG. 3 illustrates a different example of a method of generating a segment file group.

In the method of generating a segment file group illustrated in FIG. 3, the generation device first conducts scene setting on the original image data 500 obtained from the image pickup device, and extracts frames that correspond to the heads of the respective scenes (SS0, SS1, SS2, . . . )

Next, the generation device generates the first segment file group 501 resulting from dividing the original image data 500 into segment files, each having first time length TL1, and generates a third segment file group 503 resulting from dividing the original image data 500 into segment files, each having second time length TL2. In the above generation, first time length TL1 and second time length TL2 are adjusted for example so that first time length TL1 is an integral multiple of second time length TL2 (so that TL1=N×TL2 is satisfied, where N is an integer). In the example illustrated in FIG. 3, they are adjusted so that TL1=5×TL2 is satisfied, i.e., so that second time length TL2 is ⅕ of first time length TL1. Thus, when first time length TL1 is 10 seconds, second time length TL2 is 2 seconds.

Next, the generation device extracts a segment file including the head of a scene from the first segment file group 501 and replaces that segment file including the head of a scene with a segment file of the third segment file group 503. In the example illustrated in FIG. 3, the first segment file SF0 in the first segment file group 501 is replaced with the first five segment files ($SF0_0$, $SF0_1$, $SF0_2$, $SF0_3$ and $SF0_4$) in the third segment file group 503. Through the above replacement of segment files, the first segment file group 501 illustrated in FIG. 3 changes to the second segment file group 502 illustrated in FIG. 2

Note that the time length of one segment file can be selected appropriately for generating a segment file group. When for example a segment file having first time length TL1 is to be redivided into a plurality of segment files, it may be divided into a plurality of segment files having time lengths that are different depending upon the periods of time from the head of the segment file having first time length TL1 and to the head of the scene.

When a segment file group is to be generated further, original image data 504 may be divided for example so that the frame of the head of the scene is the head of the segment files.

Figure 4:
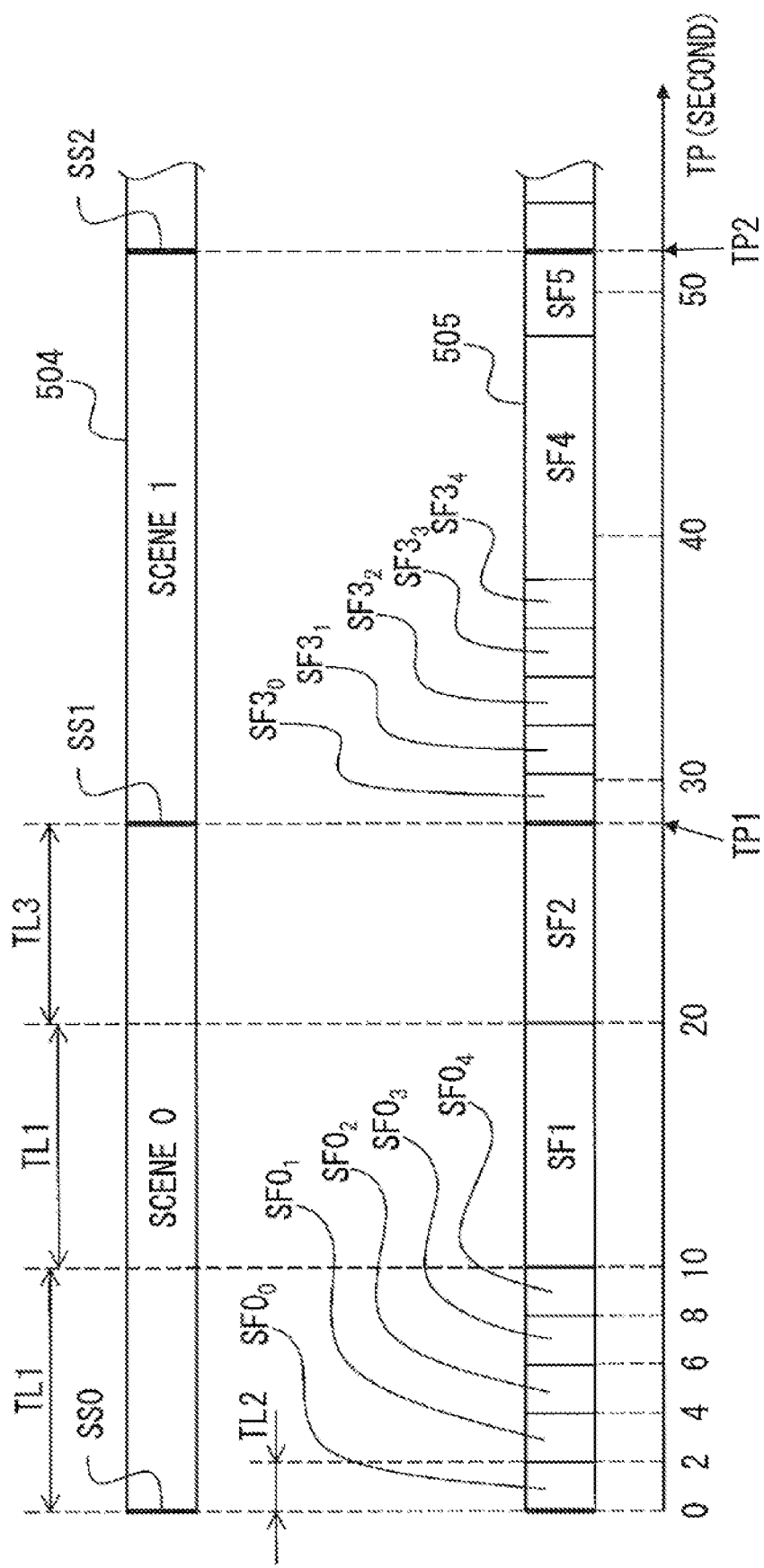
FIG. 4 illustrates a still different example of a method of generating a segment file group.

FIG. 4 illustrates a still different example of a method of generating a segment file group.

In the method of generating a segment file group illustrated in FIG. 4, the generation device first conducts scene setting on the original image data 504 obtained from the image pickup device, and extracts frames corresponding to the heads of respective scenes (SS0, SS1, SS2, . . . ).

Next, for each scene and from the head of the scene, the generation device divides the data into segment files, each having first time length TL1. When remaining time TL3 in a scene has become equal to or shorter than first time length TL1 in the division of one scene, the generation device treats the data having remaining time TL3 as the last segment file of that scene.

Next, for each scene, the generation device redivides the first segment file having first time length TL1 into a plurality of segment files each having second time length TL2 so as to generate a fourth segment file group 505. At this time as well, the relationship between first time length TL1 and second time length TL2 is arbitrary, and second time length TL2 is ⅕ of first time length TL1 in the example illustrated in FIG. 4. Accordingly, scene 0 for example is divided into five segment files ($SF0_0$, $SF0_1$, $SF0_2$, $SF0_3$ and $SF0_4$) having second time lengths TL2 that correspond to the range of first time length TL1 from scene head SS0. Then, the portion later than fifth segment file $SF0_4$ in scene 0 is divided into segment files SF1 and SF2, segment file SF1 having first time length TL1 and segment file SF2 having remaining time TL3. Also, scene 1 for example is divided into five segment files ($SF3_0$, $SF3_1$, $SF3_2$, $SF3_3$ and $SF3_4$) having second time lengths TL2 that correspond to the range of first time length TL1 from scene head SS1. Then, the portion later than fifth segment file $SF3_4$ in scene 1 is divided into segment file $SF_4$ and SF5, segment file SF4 having first time length TL1 and segment file SF5 having the remaining time length.

The segment file group (video image data to be distributed) generated in the above method is stored in the distribution server 2. In the above process, the generation device or the distribution server 2 generates a playlist as illustrated in FIG. 5 for each piece of video image data. A playlist is stored in the distribution server 2 together with a segment file group.

FIG. 5 illustrates a configuration example of a playlist. Note that FIG. 5 illustrates an example of a playlist for the second segment file group 502 illustrated in FIG. 2.

As illustrated in FIG. 5, a playlist 251 registers, for each segment file included in a segment file group, a segment number, a URL indicating the storage location of a segment file and the time of day of ahead in an associated manner. A segment number is a number that is assigned from the first segment file in a segment file group (video image data). For example, segment numbers 0-0 through 0-4 respectively indicate segment files $SF0_0$ through $SF0_4$ illustrated in FIG. 2. Also, segment number 1 indicates segment file SF1 illustrated in FIG. 2.

When the operator of the video image reproduction device 3 manipulates the video image reproduction device 3 so as to select a video image to view, the video image reproduction device 3 transmits a distribution request for the video image data (segment file group) to the distribution server 2. Receiving the distribution request, the distribution server 2 refers to the playlist of the video image data specified by the distribution request and sequentially transmits the data from the first segment file to the video image reproduction device 3. In the above transmission, the distribution server 2 first transmits to the video image reproduction device 3 a segment file having second time length TL2, i.e., a segment file having a time length shorter than that of a segment file divided by first time length TL1.

FIG. 6 is a sequence diagram for explaining a method of distributing video image data. Note that FIG. 6 is a sequence diagram for a case where the video image reproduction device 3 requested the distribution of the video image data (segment file group) corresponding to the playlist illustrated in FIG. 5 from the head of the video image.

When the operator conducts a prescribed manipulation on the video image reproduction device 3 so as to confirm the video image to view, a distribution request is transmitted to the distribution server 2 from the video image reproduction device 3 as illustrated in FIG. 6 (step S101).

Receiving the distribution request, the distribution server 2 reads the playlist of the video image data specified by the distribution request and transmits to the video image reproduction device 3 the segment file that is to be first reproduced in accordance with the playlist (step S102). When segment files are to be transmitted in accordance with the playlist 251 illustrated in FIG. 5, the segment file that is to be first reproduced is segment file $SF0_0$ with segment number 0-0. Thus, the distribution server 2 makes an access by using the URL associated with segment number 0-0 so as to read segment file $SF0_0$ and transmits the file to the video image reproduction device 3. In the above transmission, the distribution server 2 also transmits the playlist to the video image reproduction device 3 together with segment file $SF0_0$.

Receiving segment file $SF0_0$ and the playlist from the distribution server 2, the video image reproduction device 3 starts to reproduce the received segment file and also transmits to the distribution server 2 a transfer request for the segment file that is to be reproduced second (step S103).

Receiving the transfer request for the second segment file, the distribution server 2 transmits to the video image reproduction device 3 the segment file that is to be reproduced second, in accordance with the transfer request. The second segment file on the playlist is segment file $SF0_1$ with segment number 0-1. Accordingly, the distribution server 2 reads segment file $SF0_1$ so as to transmit it to the video image reproduction device 3.

Thereafter, the video image reproduction device 3 transmits to the distribution server 2 a transfer request for a next segment file each time the video image reproduction device 3 receives a segment file from the distribution server 2 (steps S105 through S112).

It is assumed in this example that the time length (second time length TL2) of first segment file $SF0_0$ is 2 seconds. In such a case, when the transfer rate of segment files between the distribution server 2 and the video image reproduction device 3 is twice the reproduction rate of the segment files, the transfer time of first segment file $SF0_0$ is about 1 second. Thus, the video image reproduction device 3 starts the reproduction of first segment file $SF0_0$ at around time of day "T0+1", which is 1 second later than time of day "T0" at which the video image reproduction device 3 transmitted the distribution request.

This can reduce a waiting time between making a request for the distribution of a video image and the start of the video image compared with a case where a segment file with first time length TL1 (10 seconds) is transmitted from the distribution server 2 to the video image reproduction device 3 from the starting time of the distribution. When for example first segment file SF0 has the first time length (10 seconds) as in the first segment file group 501 illustrated in FIG. 2, the transfer time of first segment file SF0 is about 5 seconds. Accordingly, the video image reproduction device 3 starts to reproduce first segment file SF0 about five seconds later than time of day T0 at which the video image reproduction device 3 transmitted the distribution request.

Also, the video image reproduction device 3 completes the reception of second segment file $SF0_1$ at around time of day "T0+2", which is 1 second later than time of day "T0+1" at which the reproduction of first segment file $SF0_0$ started. At that moment, the video image reproduction device 3 is still reproducing first segment file $SF0_0$. In response to this situation, the video image reproduction device 3 holds received second segment file $SF0_1$ in the buffer for 1 second, i.e., until the reproduction of first segment file $SF0_0$ is terminated. Further, after the reception of second segment file $SF0_1$, the video image reproduction device 3 has consecutively transmitted to the distribution server 2 a transfer request for the third segment file. Accordingly, the reception of the third segment file is completed at around time of day "T0+3", which is about 1 second later than the time of day of the completion of the reception of the second segment file, i.e., at around the time of day at which the reproduction of first segment file $SF0_0$ is terminated.

As described above, when the time length of a segment file is 2 seconds and the transfer rate is twice the reproduction rate, the margin between the time of day of the completion of the reception and the time of day of the completion of the reproduction of a received segment file increases by about 1 second each time one segment file is received. Accordingly, the margin at the time of day of the completion of the reception of segment file $SF0_4$ with segment number 0-4 transmitted on the basis of the playlist 251 illustrated in FIG. 5 is about 5 seconds. In other words, the time of day at which the reproduction of segment file $SF0_4$ with segment number 0-4, which is the fifth segment file counting from the head of scene 0, is around time of day "T0+10", which is 5 seconds later than the time of day of the completion of the reception.

When the transfer rate of a segment file is twice the reproduction rate of the segment file, the transfer time of a segment file with the time length of 10 seconds is about 5 seconds. In other words, when a request for segment file SF1 with segment number 1 is made consecutively after the reception of segment file $SF0_4$ with segment number 0-4, the time of day at which the reproduction of segment file $SF0_4$ is terminated and the time of day of the completion of the reception of segment file SF1 roughly coincide. Accordingly, the waiting time between the termination of the reproduction of segment file $SF0_4$ with segment number 0-4 and the start of the reproduction of segment file SF1 with segment number 1 is almost zero.

Further, a segment file to be transmitted to the video image reproduction device 3 from the distribution server 2 after the transmission of segment file $SF0_4$ with segment number 0-4 is a segment file having a time length that is five times as long as second time length TL2. This can suppress an increase in the transfer frequency of segment files between the distribution server 2 and the video image reproduction device 3 so as to suppress an increase in the process loads on the distribution server 2.

As will be explained below, in the video image distribution system 1 exemplified in this specification, the segment file that is to be reproduced by the video image reproduction device 3 first is read in advance when the search result etc. is displayed in the video image reproduction device 3. This further reduces a waiting time in the video image reproduction device 3 between the selection of a video image to reproduce and the start of the reproduction of the video image.

FIG. 7 illustrates a functional configuration of a distribution server in the video image distribution system according to the first embodiment.

As illustrated in FIG. 7, the distribution server 2 according to the present embodiment includes a distribution management unit 210, a communication unit 220, a web page storage unit 230, a scene information storage unit 240, a playlist storage unit 250 and a video image data storage unit 260.

The distribution management unit 210 conducts the management of video image data (segment file group) distributed by the distribution server 2, the management of the transmission of segment files to the video image reproduction devices 3, and other processes. The communication unit 220 performs communications with the video image reproduction devices 3 via the communication network 4.

The web page storage unit 230 stores a web page such as a video player window, a search window, etc., to be displayed in the video image reproduction devices 3. The scene information storage unit 240 stores scene information of each piece of video image data (segment file group) used for searching for video images. The playlist storage unit 250 stores playlists of respective pieces of video image data. The video image data storage unit 260 stores video image data.

Figure 8:
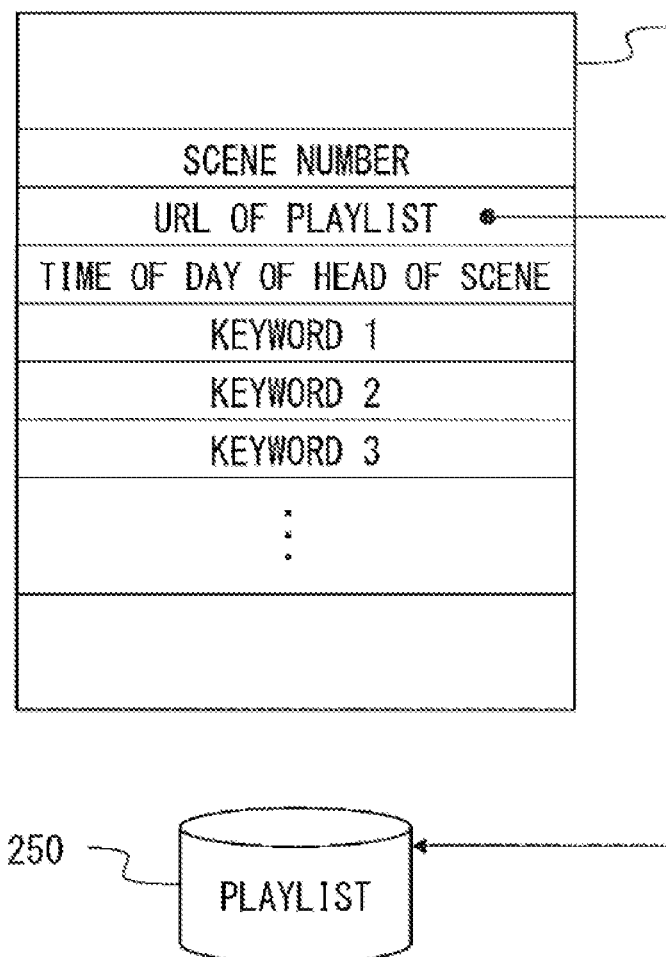
FIG. 8 illustrates an example of scene information.

FIG. 8 illustrated an example of scene information.

As illustrated in FIG. 8, scene information 241 to be stored in the scene information storage unit 240 includes a scene number, the URL of a playlist, the time of day of the head of a scene, and a plurality of keywords.

A scene number is an identifier such as a serial number for identifying a plurality of pieces of scene information included in the scene information 241. The URL of a playlist is information for identifying a playlist of video image data including the corresponding scene from among the playlists stored in the playlist storage unit 250. The time of day of the head of a scene is information indicating the head of the corresponding scene in video image data.

A plurality of keywords (keywords 1, 2, 3, . . . ) are character strings indicating a characteristic of the corresponding scene. In a case when for example a video image of a baseball game has been divided for each batter, the name of the batter, the name of the pitcher, the results, the locations of pitched balls, the types of pitches, the directions of the batted balls, etc. are registered as the scene information 241.

Figure 9:
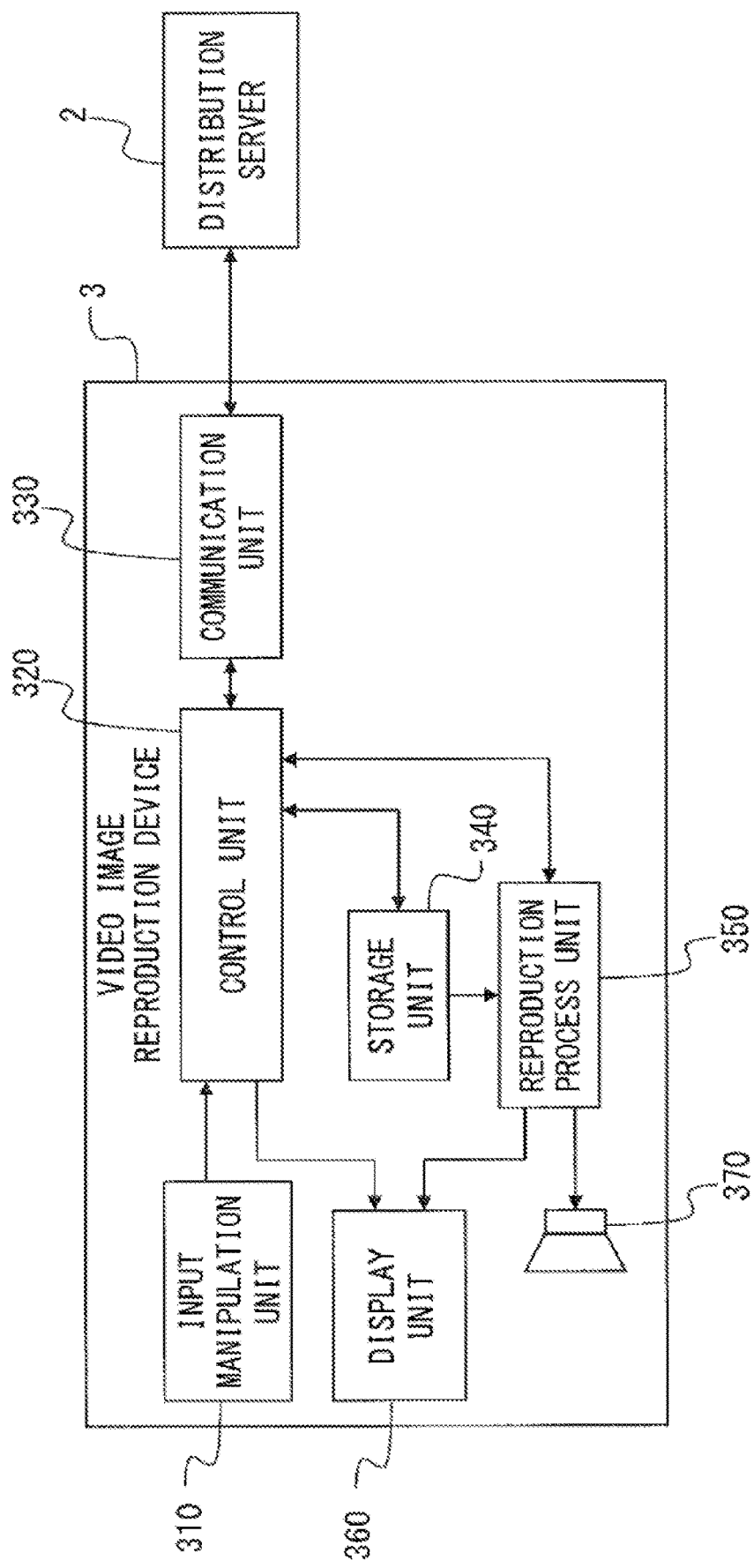
FIG. 9 illustrates a functional configuration of a video image reproduction device in the video image distribution system according to the first embodiment.

FIG. 9 illustrates a functional configuration of a video image reproduction device in the video image distribution system according to the first embodiment.

As illustrated in FIG. 9, the video image reproduction device 3 according to the present embodiment includes an input manipulation unit 310, a control unit 320, a communication unit 330, a storage unit 340, a reproduction process unit 350, a display unit 360 and a speaker 370.

The input manipulation unit 310 receives various types of input manipulations such as an input manipulation conducted by the operator in order to view a video image or other manipulations. Input manipulations conducted by the operator include a manipulation of activating (executing) a program for viewing a video image, a manipulation of searching for a video image, and a manipulation of selecting a video image to view.

The control unit 320 controls the operation of the video image reproduction device 3 on the basis of an input manipulation received by the input manipulation unit 310. The operations controlled by the control unit 320 include an operation of transmitting the search request and a distribution request for a video image to the distribution server 2. Also, the operations controlled by the control unit 320 include operations of making the storage unit 340 store scene information, a playlist, and video image data (segment files) obtained from the distribution server 2 and operations of making the reproduction process unit 350 perform the reproduction process of a segment file.

The communication unit 330 conducts communications with the distribution server 2 via the communication network 4. The storage unit 340 stores a web page, scene information, a playlist, a segment file, etc. obtained from the distribution server 2. The reproduction process unit 350 performs a reproduction process etc. of a segment file stored in the storage unit 340. The display unit 360 displays a web page or a video image reproduced by the reproduction process unit 350. The speaker 370 outputs audio reproduced by the reproduction process unit 350.

Figure 10:
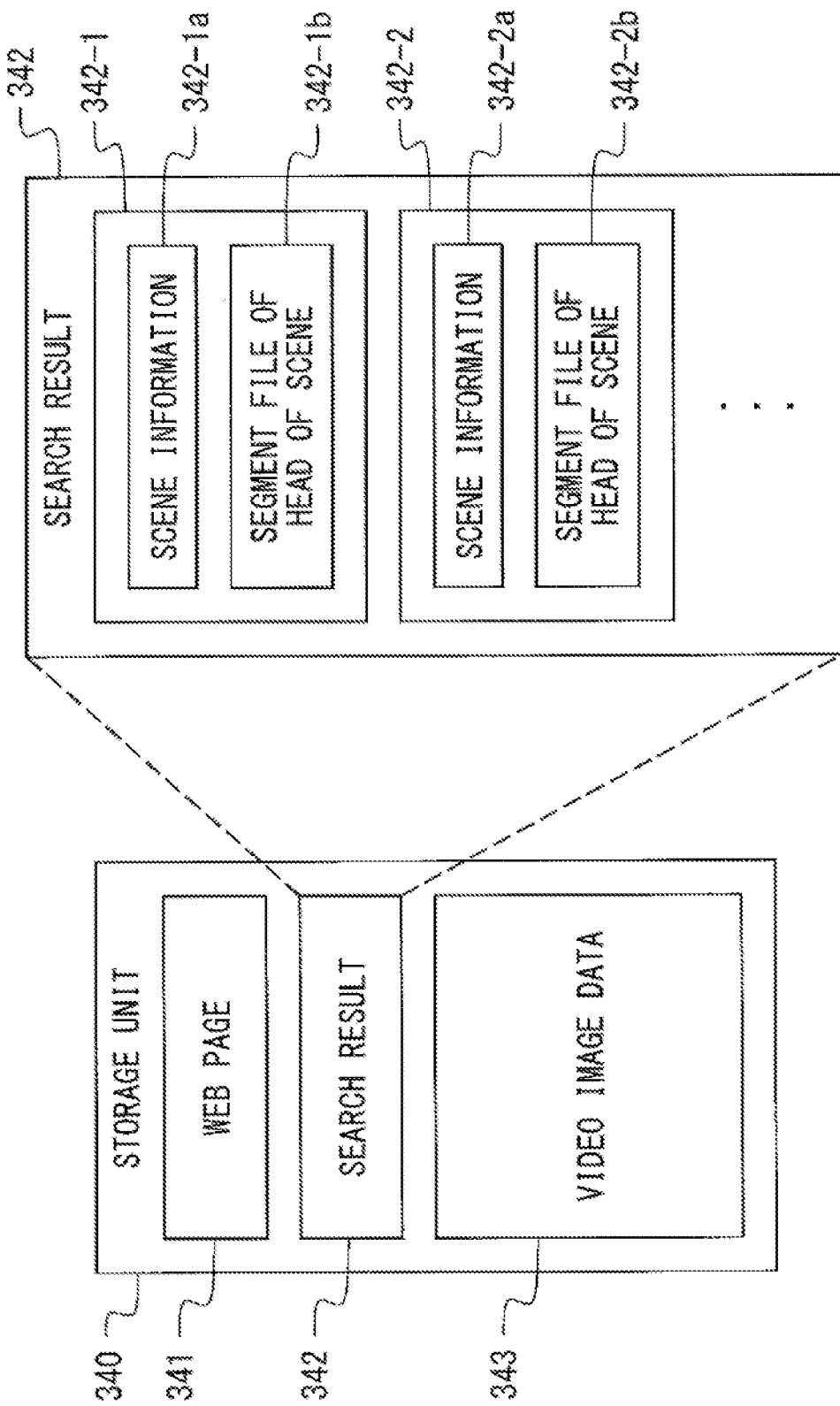
FIG. 10 illustrates a configuration of a storage unit in the video image reproduction device according to the first embodiment.

FIG. 10 illustrates a configuration of a storage unit in the video image reproduction device according to the first embodiment.

The storage unit 340 of the video image reproduction device 3 includes a web page storage unit 341, a search result storage unit 342 and a video image data storage unit 343 as illustrated in for example FIG. 10.

The web page storage unit 341 stores a web page such as a video player window etc. used for viewing a video image.

The search result storage unit 342 stores a search result of a video image. The search result storage unit 342 stores a pair of scene information including a keyword specified by the operator and the segment file of the head of the scene identified by that scene information as one search result. The segment file of the head of a scene is identified on the basis of the URL in the playlist included in the scene information and the time of day of the head of the scene. FIG. 10 illustrates two search results, i.e., a first search result 342-1 and a second search result 342-2 as examples of search results to be stored by the search result storage unit 342. The first search result 342-1 includes scene information 342-1a including a keyword in the scene information 241 and a segment file 342-1b of the head of the scene identified by that scene information 342-1a. The second search result 342-2 includes different scene information 342-2a including a keyword in the scene information 241 and a segment file 342-2b of the head of the scene identified by that scene information 342-2a.

For obtaining video image data (segment file group) from the distribution server 2 so as to reproduce it, the video image data storage unit 343 stores a segment file that is later in time than the segment file being reproduced.

Figure 11:
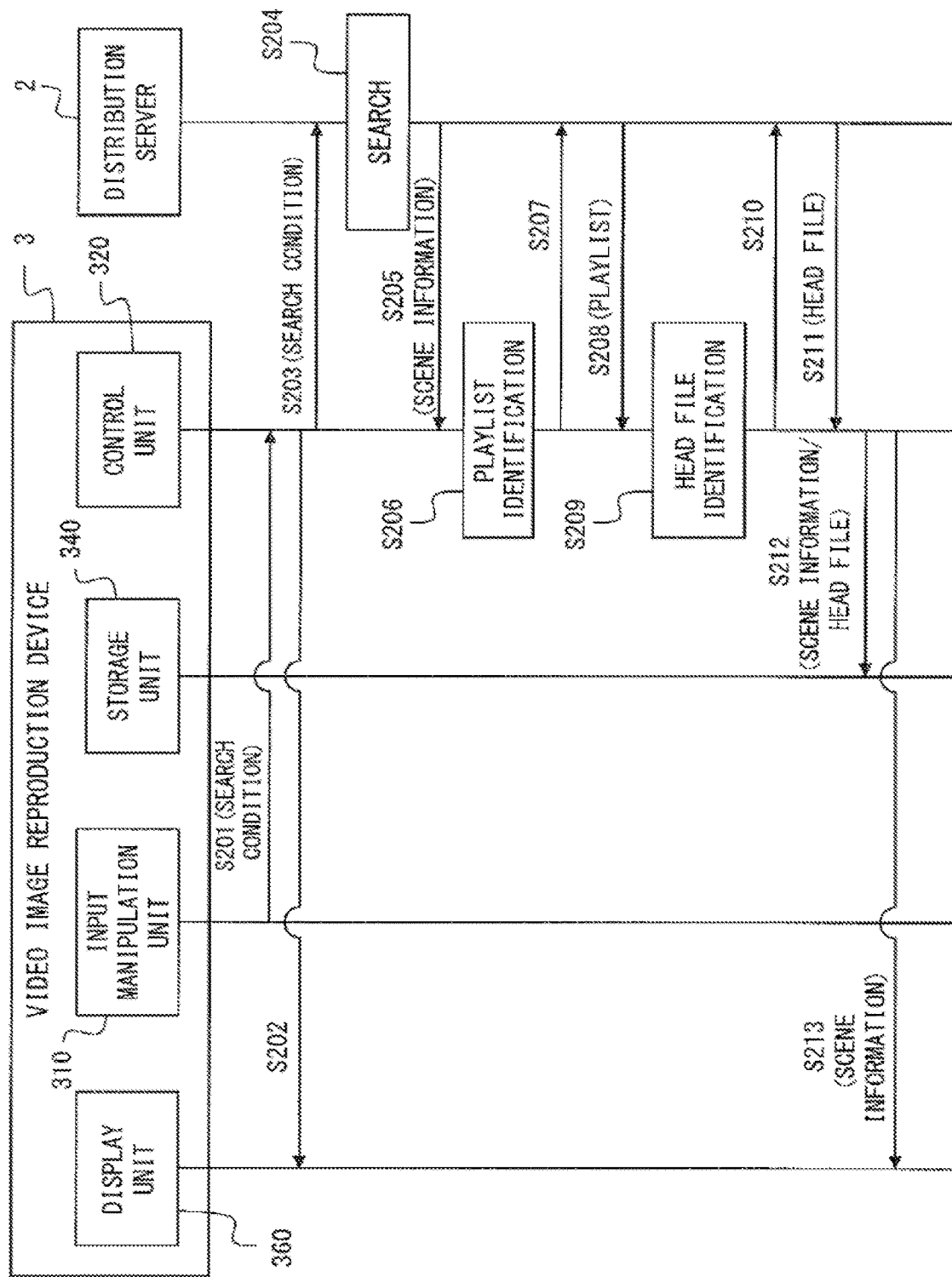
FIG. 11 is a sequence diagram for explaining a search process in the video image distribution system according to the first embodiment.

FIG. 11 is a sequence diagram for explaining a search process in the video image distribution system according to the first embodiment.

Receiving a prescribed input manipulation by the operator in for example the input manipulation unit 310, the video image reproduction device 3 makes the display unit 360 display a video player window for viewing the video image. A prescribed input manipulation by the operator includes for example a manipulation of activating a web browser and a manipulation of making the web browser display the web page of the video player window. A video player window includes a video image display area for displaying a video image, a list display area for displaying a list of video images that can be viewed, a search area for performing search for a video image, etc.

When the operator manipulates the input manipulation unit 310 and inputs a search condition in a state in which the video player window is displayed, the search condition is transmitted from the input manipulation unit 310 to the control unit 320 as illustrated in FIG. 11 (step S201).

Receiving the search condition, the control unit 320 makes the display unit 360 display a video player window with the search condition added to it (step S202) and also transmits a search request to the distribution server 2 (step S203). The search request transmitted to the distribution server 2 in step S203 includes the search condition.

Receiving the search request, the distribution server 2 searches the scene information 241 of the scene information storage unit 240 on the basis of the search condition included in the search request (step S204). When the scene information 241 includes scene information that meets the search condition, the distribution server 2 extracts that scene information and transmits it to the video image reproduction device 3 (step S205). When the scene information 241 does not include scene information that meets the search condition, the distribution server 2 transmits to the video image reproduction device 3 information reporting that scene information meeting the search condition does not exist, although this is not illustrated in FIG. 11.

In the video image reproduction device 3 that has received scene information that meets the search condition, the control unit 320 identifies the playlist of the video image by using the received scene information (step S206). In step S206, the control unit 320 reads the URL (see FIG. 8) of the playlist included in the scene information so as to identify the playlist of the video image.

After identifying the playlist of the video image, the video image reproduction device 3 (the control unit 320) transmits a transfer request for the playlist to the distribution server 2 (step S207). A transfer request for a playlist includes the URL of a playlist read from scene information.

Receiving the transfer request for the playlist, the distribution server 2 transmits to the video image reproduction device 3 the playlist read from the playlist storage unit 250 on the basis of the URL of the playlist included in the transfer request (step S208).

In the video image reproduction device 3 that received the playlist, the control unit 320 uses the scene information and the playlist so as to identify the segment file of the head of the scene (head file) corresponding to the scene information (step S209). In step S209, the control unit 320 reads the URL of the segment file including the time of day of the head of the scene from the playlist after reading the time of day of the head of the scene included in the scene information.

Identifying the head file, the video image reproduction device 3 (control unit 320) transmits a transfer request for the head file to the distribution server 2 (step S210). A transfer request for ahead file includes the URL of a segment file read from a playlist.

Receiving the transfer request for a head file, the distribution server 2 transmits, to the video image reproduction device 3 and as the head file, the segment file read from the video image data storage unit 260 on the basis of the URL of the segment file included in the transfer request (step S211).

In the video image reproduction device 3 that received the head file, the control unit 320 first makes the search result storage unit 342 of the storage unit 340 store the pair of the scene information and the head file as a search result (step S212). Also, the control unit 320 makes the display unit 360 display a video player window with the obtained scene information added to it (step S213).

Note that when a plurality of pieces of scene information have been extracted by the search in step S204 in the distribution server 2, the processes of steps S205 through S213 are performed on each of the extracted pieces of scene information between the distribution server 2 and the video image reproduction device 3.

As described above, in the video image distribution system according to the present embodiment, when the video image reproduction device 3 is used for searching for a video image, the video image reproduction device 3 obtains scene information regarding a scene that meets a search condition and a segment file including the head of that scene. In other words, when searching for a video image, the video image reproduction device 3 reads in advance a segment file (head file) of the video image corresponding to the search result before receiving a reproduction instruction of the video image (before a reproduction instruction of the video image is input). As illustrated in FIG. 2, in video image data distributed in the video image distribution system according to the present embodiment, second time length TL2 of the segment file including the head of a scene is shorter than first time length TL1 of a segment file that is to be reproduced after the reproduction of a prescribed number of segment files. Because of this, the segment file including the head of a scene uses a small volume, suppressing the loads on the network for transmitting the file from the distribution server 2 to the video image reproduction device 3. This makes it possible for the video image reproduction device 3 to obtain a segment file including the head of a scene while preventing an increase in the loads on a network even when a plurality of pieces of scene information that meet the search condition are extracted.

Figure 12:
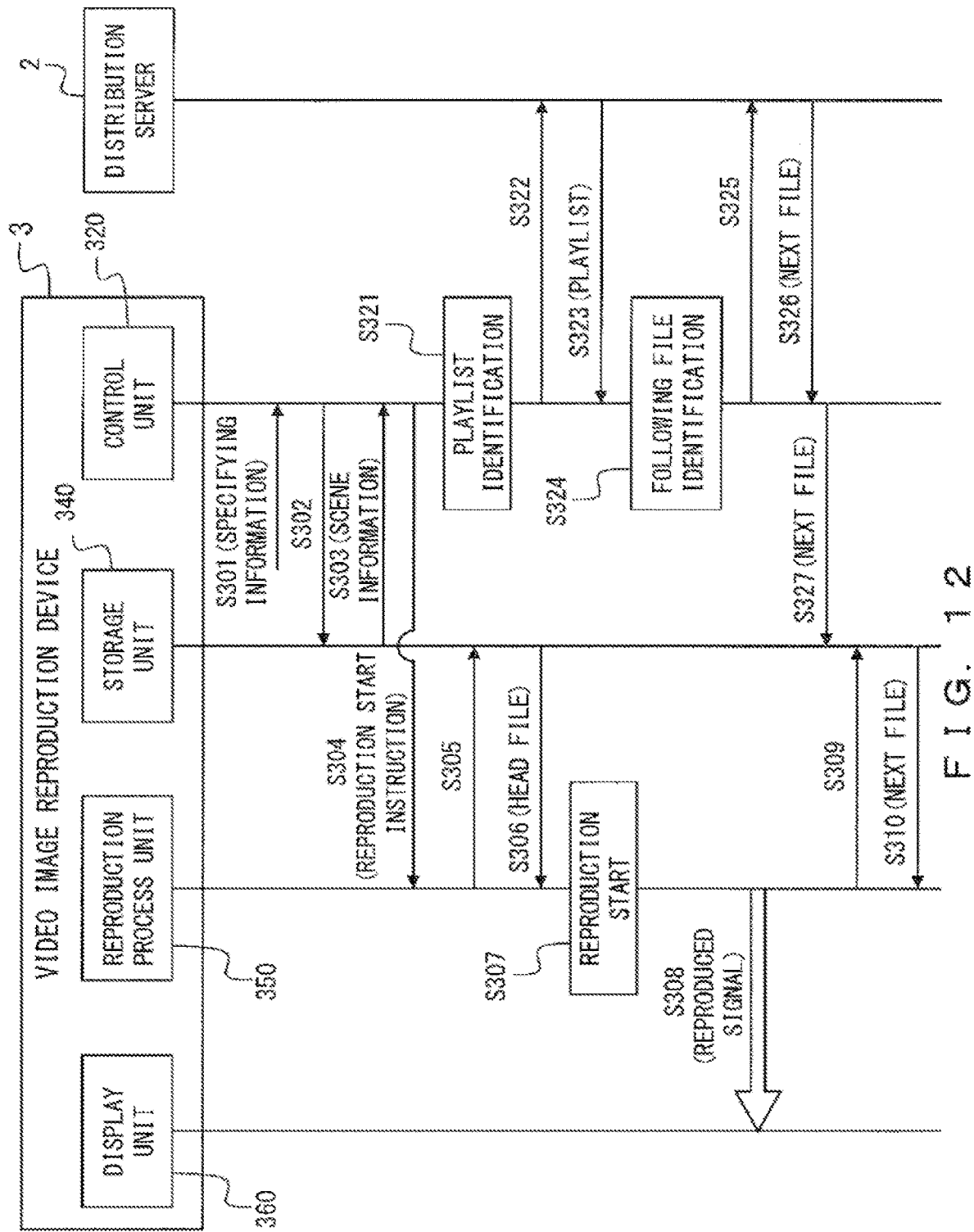
FIG. 12 is a sequence diagram for explaining a reproduction process of a video image in the video image distribution system according to the first embodiment.

FIG. 12 is a sequence diagram for explaining a reproduction process of a video image in the video image distribution system according to the first embodiment.

When the operator has conducted a manipulation of specifying a video image to reproduce (view) in a state in which the search result that was obtained through the above search process is displayed in the video image reproduction device 3, specifying information is input to the control unit 320 as illustrated in FIG. 12 (step S301). Specifying information includes scene information of video image data specified by the operator.

In response to the input of specifying information, the control unit 320 accesses the search result storage unit 342 of the storage unit 340 so as to read scene information (steps S302 and S303).

After reading scene information, the control unit 320 outputs a reproduction start instruction to the reproduction process unit 350 (step S304) and also identifies the playlist of the video image data that is to be reproduced on the basis of the scene information (step S321). The reproduction start instruction output to the reproduction process unit 350 includes information specifying the segment file of the head of the scene (head file) associated with the read scene information.

The reproduction process unit 350 to which the reproduction start instruction has been input from the control unit 320 accesses the search result storage unit 342 of the storage unit 340 so as to read the head file specified in the reproduction start instruction (steps S305 and S306). The reproduction process unit 350 thereafter starts the reproduction of the read head file (step S307) and outputs a reproduced signal to the display unit 360 and a speaker (not illustrated) (step S308).

Meanwhile, the control unit 320, after outputting the reproduction start instruction, identifies the playlist of the video image data that is to be reproduced in step S321 as described above.

In step S321, the control unit 320 reads the URL (see FIG. 8) of the playlist included in the scene information so as to identify the playlist of the video image.

After identifying the playlist of the video image, the video image reproduction device 3 (control unit 320) transmits to the distribution server 2 a transfer request for the playlist (step S322). A transfer request for a playlist includes the URL of the playlist read from scene information.

Receiving the transfer request for the playlist, the distribution server 2 transmits, to the video image reproduction device 3, the playlist read from the playlist storage unit 250 on the basis of the URL of the playlist included in the transfer request.

In the video image reproduction device 3 that received the playlist, the control unit 320 uses the scene information and the playlist so as to identify a segment file (following file) that follows the segment file being reproduced (head file) (step S324). In step S324, the control unit 320 reads the URL of a segment file that is later in time than the segment file, including the time of day of the head of the scene in the playlist on the basis of the time of day of the head of the scene included in the scene information.

After identifying the following file, the video image reproduction device 3 (control unit 320) transmits to the distribution server 2 a transfer request for a segment file to be reproduced second (next file) (step S325).

Receiving the transfer request for the next file, the distribution server 2 transmits, to the video image reproduction device 3 and as the next file, a segment file read from the video image data storage unit 260 on the basis of the URL of the segment file included in the transfer request (step S326).

In the video image reproduction device 3 that has received the next file, the control unit 320 makes the video image data storage unit 343 of the storage unit 340 store the received next file (step S327). When the received next file is the segment file that is to be reproduced next to the head file, the video image reproduction device 3 is still reproducing the head file at the moment of the completion of the reception of the next file as illustrated in FIG. 5. In response to this situation, the video image reproduction device 3 makes the video image data storage unit 343 store the received next file.

Also, after storing the next file in the video image data storage unit 343 in step S327, the control unit 320 repeats the processes in step S325 through 327, although this is omitted in FIG. 12. Note that a transfer request for a next file to be transmitted in step S325 after the reception of the second segment file includes the URL of the segment file that is the earliest in time among segment files that are later in time than the head file and that have not been obtained.

Also, slightly before the termination of the reproduction of the head file, the reproduction process unit 350 accesses the video image data storage unit 343 of the storage unit 340 so as to read the next file (step S309 and S310). Then, the reproduction of the next file starts at the same time as the termination of the reproduction of the head file. Thereafter, immediately before the termination of the reproduction of a segment file, the reproduction process unit 350 accesses the video image data storage unit 343 of the storage unit 340 so as to read segment files that are to be reproduced next, and reproduces them sequentially.

As described above, the video image reproduction device 3 according to the present embodiment, when reproducing a video image, starts the reproduction from the segment file including the head of a scene (head file) that has been stored in the storage unit 340 of the video image reproduction device 3 itself. Then, the video image reproduction device 3 obtains the next segment file from the distribution server 2 during the reproduction of the head file, and thereafter obtains sequentially from the distribution server 2 segment files that are later in time than the segment file being reproduced. Accordingly, the present embodiment can reduce a waiting time between the specifying of a video image that is to be reproduced in the video image reproduction device 3 and the start of the reproduction.

Also, the distribution server 2 first transmits to the video image reproduction device 3 a prescribed number of segment files which include a head file and each of which has a short time length. After a sufficient margin has been secured in the video image reproduction device 3, the distribution server 2 transmits a segment file having a long time length. This can suppress an increase in the transfer frequency of segment files between the distribution server 2 and the video image reproduction devices 3 so as to suppress an increase in the process loads on the distribution server 2.

Note that the functional configuration of the distribution server 2 illustrated in FIG. 7 is just exemplary, and part of the configuration may be changed or other constituents may be added as needed. Also, the video image data storage unit 260 for example may be provided in a server that is independent from the distribution server 2.

Also, the search process illustrated in FIG. 11 is just exemplary, and regarding the search process of the video image distribution system 1 according to the present embodiment, the order and contents of some of the processes of the search process illustrated in FIG. 11 may be changed and other processes may be added to the search process illustrated in FIG. 11 as needed. When for example scene information (a search result) has been obtained from the distribution server 2, it is also possible for example to additionally perform a process of determining whether or not the obtained scene information has already been stored in the search result storage unit 342 of the storage unit 340. When the search result (scene information) obtained from the distribution server 2 includes scene information that has already been stored in the search result storage unit 342, the process of obtaining the segment file of the head of the scene corresponding to that scene information may be omitted. This makes it possible to prevent the video image reproduction device 3 from obtaining again the segment file of the head of a scene that has already been obtained in a case when a search condition is changed. This can suppress an increase in the traffic in the communication network 4 caused by unnecessary transfer of segment files between the distribution server 2 and the video image reproduction devices 3.

Also, the reproduction process of a video image illustrated in FIG. 12 is just exemplary, and regarding the reproduction process of the video image distribution system according to the present embodiment, the order and contents of some of the processes may be changed in the reproduction process illustrated in FIG. 12 and other processes may be added to the reproduction process illustrated in FIG. 12 as needed.

Further, the playlist 251 illustrated in FIG. 5 is just an example of a playlist used in the video image distribution system 1 and may be changed appropriately in accordance with the distribution form of segment data. When for example the video image reproduction device 3 conducts reproduction from a scene in accordance with the playlist illustrated in FIG. 5, a segment file having a short time length is transferred between the video image reproduction device 3 and the distribution server 2 each time a scene transitions to the next scene. Meanwhile, when the first segment file group 501 and the second segment file 503 generated from one piece of the original image data 500 illustrated in FIG. 3 are stored in the video image data storage unit 260, segment files to be distributed can be switched for each first time length TL1. This makes it possible for example to read from the second segment file 503 only a prescribed number of segment files from the head of the scene at which the video image reproduction device 3 started the reproduction so as to read subsequent segment files from the first segment file group. Thereby, playlists may employ a configuration in which for example the URLs of segment files in the second segment file group and the URLs of segment files in the first segment file group are described in the portions of the heads of the second and subsequent scenes. When a playlist of this configuration is used, the control unit 320 of the video image reproduction device 3 for example performs control of obtaining, from the second segment file group, only a prescribed number of segment files from among segment files including the time of day of the head of the scene in scene information. It is also possible to generate, for example for each piece of scene information, a playlist in which only the URLs of a prescribed number of segment files including the head of the scene of the corresponding scene information are treated as the URLs of segment files of the second segment file group, and to make the playlist storage unit 250 store the playlist. In such a case, the distribution server 2 extracts a playlist associated with scene information meeting a search condition or a playlist associated with scene information included in a distribution request from among a plurality of playlists generated for one piece of video image data, and transmits the playlist to the video image reproduction device 3.

Hereinafter, explanations will be given for the operations of the video image reproduction devices 3 and the distribution server 2 in a system that distributes a video image of a baseball game as a specific example of the video image distribution system 1 according to the present embodiment.

Figure 13:
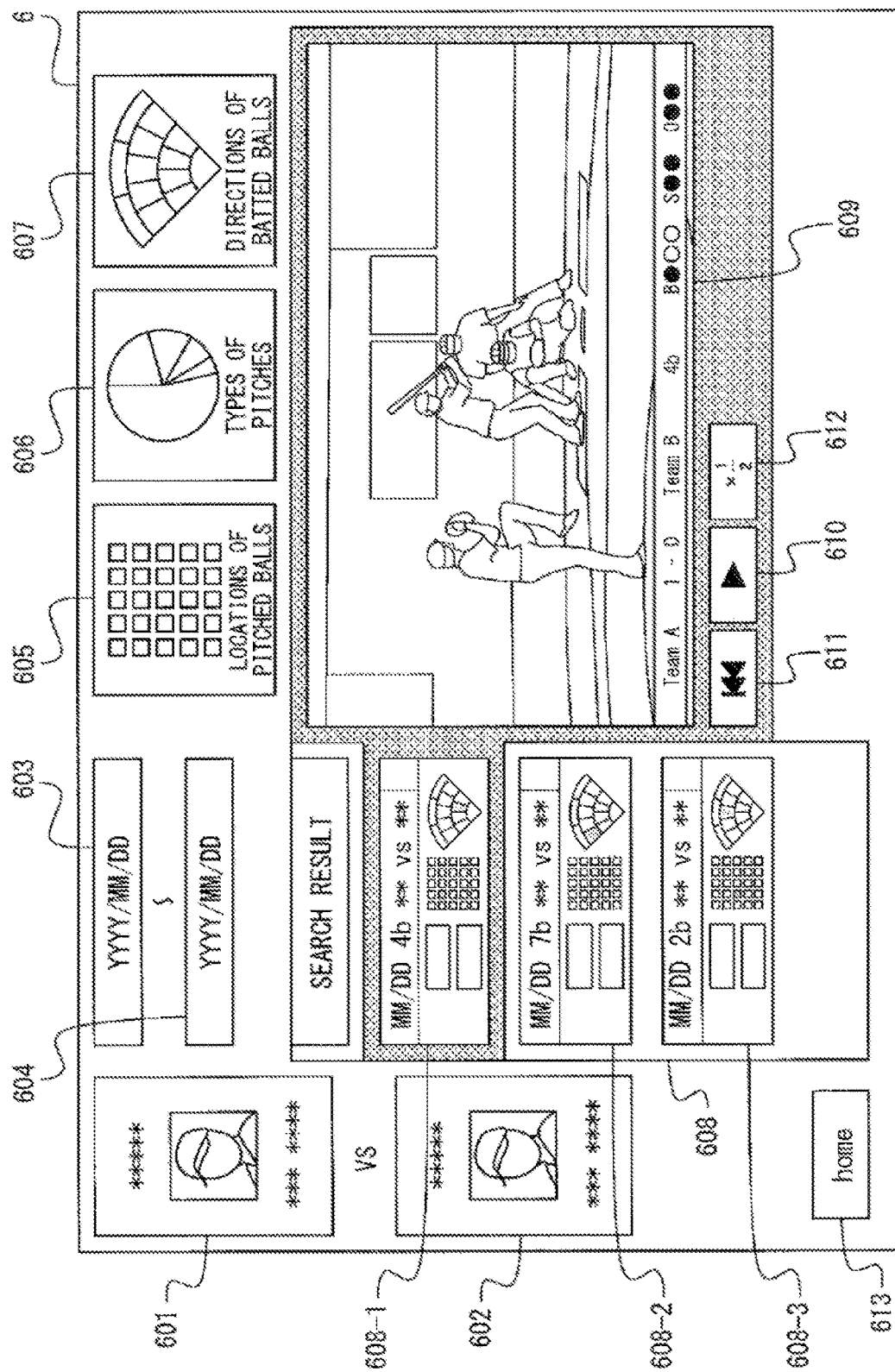
FIG. 13 illustrates an example of a video player window.

FIG. 13 illustrates an example of a video player window.

As illustrated in FIG. 13, a video player window 6 includes player display areas 601 and 602, game date display areas 603 and 604, a pitched-ball location display area 605, a type-of-pitch display area 606 and a batted-ball direction display area 607. The video player window 6 also includes a search result display area 608, a video image display area 609, a play button 610, a back-to-head button 611, a slow motion button 612 and a home button 613.

The player display areas 601 and 602 are areas for displaying batters and pitchers in the video image that is to be viewed. The player display areas 601 and 602 function also as a display switch button for displaying a player selection window for selecting players.

The game date display areas 603 and 604 are areas for displaying a search condition regarding the date of a game to view. The date of a game is displayed in for example the format of "YYYY/MM/DD" in the game date display areas 603 and 604. "YYYY", "MM" and "DD" indicate the year, the month and the day, respectively. These game date display areas 603 and 604 function also as a display switch button for displaying a game date selection window for selecting a period of the dates of games.

The pitched-ball location display area 605 is an area for displaying a search condition regarding the location of a pitch by a pitcher, and displays a pitched-ball location specifying unit made of 5×5 boxes. The pitched-ball location display area 605 uses different colors for displaying the box corresponding to the location of a pitched ball specified as a search target and boxes corresponding to locations of pitched balls that are not specified, and thereby indicates a search condition (i.e., which of the locations of pitched balls has been specified as a search target). This pitched-ball location display area 605 functions also as a display switch button for displaying a pitched-ball location selection window for selecting the pitched-ball location as a search target.

The type-of-pitch display area 606 is an area for displaying a search condition regarding the type of a pitch by a pitcher, and displays a pie chart that indicates types of pitches by the pitcher in the game and the ratios between them. The type-of-pitch display area 606 uses different colors for displaying the sector corresponding to the type of the pitch specified as a search condition and sectors corresponding to types of pitches that are not specified, and thereby indicates a search condition (which of the types of pitches is specified as a search target). This type-of-pitch display area 606 functions also as a display switch button for displaying a type-of-pitch selection window for selecting a type of a pitch as a search condition.

The batted-ball direction display area 607 is an area for displaying a search condition regarding a direction of a batted ball, and displays a figure simulating a baseball field. The figure of the filed is divided into a plurality of areas that indicate the positions at which fielders caught the balls or an area that indicates a homerun. The type-of-pitch display area 606 uses different colors for displaying the area corresponding to the direction specified as a search condition and areas corresponding to directions that are not specified, and thereby indicates a search condition (i.e., which of the directions specified as a search target). This batted-ball direction display area 607 functions also as a display switch button for displaying a direction selection window for selecting a direction as a search condition.

The search result display area 608 is an area for displaying pieces of scene information 608-1, 608-2 and 608-3 that meet the above various types of search conditions obtained as the search results. The pieces of the scene information 608-1, 608-2 and 608-3 are results of visualizing some of the keywords of the respective pieces of scene information (see FIG. 8) by using a prescribed method. "MM/DD" in the pieces of scene information 608-1, 608-2 and 608-3 respectively indicate the month (MM) and the date (DD) at which the game was held. "4b", "7b" and "2b" appearing in the pieces of scene information 608-1 through 608-3 indicate "bottom of the fourth inning", "bottom of the seventh inning", and "bottom of the second inning", respectively. Note that when there are so many scenes that meet the search conditions that it is not possible to display all pieces of scene information in the search result display area 608, pieces of scene information to be displayed in the search result display area 608 can be switched by for example a vertical scroll bar.

The video image display area 609 is an area for displaying a scene (video image) corresponding to one of the pieces of scene information 608-1, 608-2 and 608-3 displayed in the search result display area 608. The video player window 6 illustrated in FIG. 13 displays a scene (video image) that corresponds to the scene information 608-1 displayed in the search result display area 608. Which of the pieces of scene information the scene displayed in the video image display area 609 corresponds to is indicated for example by emphasizing the frame including the video image display area 609 and the scene information display area.

The play button 610 is a button for starting the reproduction of a video image from the scene displayed in the video image display area 609. The back-to-head button 611 is a button for returning to the head of the scene that is being reproduced. The slow motion button 612 is a button for reproducing a video image at a slow speed, e.g., at a speed half the reproduction speed based on for example the time-of-day information in the video image data. When the operator of the video image reproduction device 3 conducts a manipulation of pushing one of the play button 610, the back-to-head button 611 and the slow motion button 612, the video image reproduction device 3 performs the reproduction process that corresponds to the pushed button. After the start of the reproduction of a video image, the play button 610 is switched to for example a pause button for pausing the reproduction of the video image, although this is not illustrated. When the operator of the video image reproduction device 3 conducts a manipulation of pushing the pause button, the video image reproduction device 3 stops the reproduction of a video image, and again displays the play button 610 in place of the pause button that has been displayed.

The home button 613 is a display switch button for switching the display of the display unit 360 of the video image reproduction device 3 to for example the home window of the web site that provides the distribution service of a video image.

The video player window 6 is displayed in the display unit 360 by for example activating the web browser in the video image reproduction device 3 and obtaining the web page from the web page storage unit 230 of the distribution server 2 through a prescribed manipulation. Note that the video images of the pieces of scene information 608-1, 608-2 and 608-3 in the search result display area 608 and the video images in the video image display area 609 are displayed by the operator conducting a manipulation of inputting a search condition in a state in which the video player window 6 is displayed. One of the manipulations of inputting a search condition is a manipulation of pausing the player display areas 601 and 602. When an operator conducts a manipulation of pushing one of the two player display areas 601 and 602 in the video player window 6, the display unit 360 displays a window for selecting a player.

Figure 14:
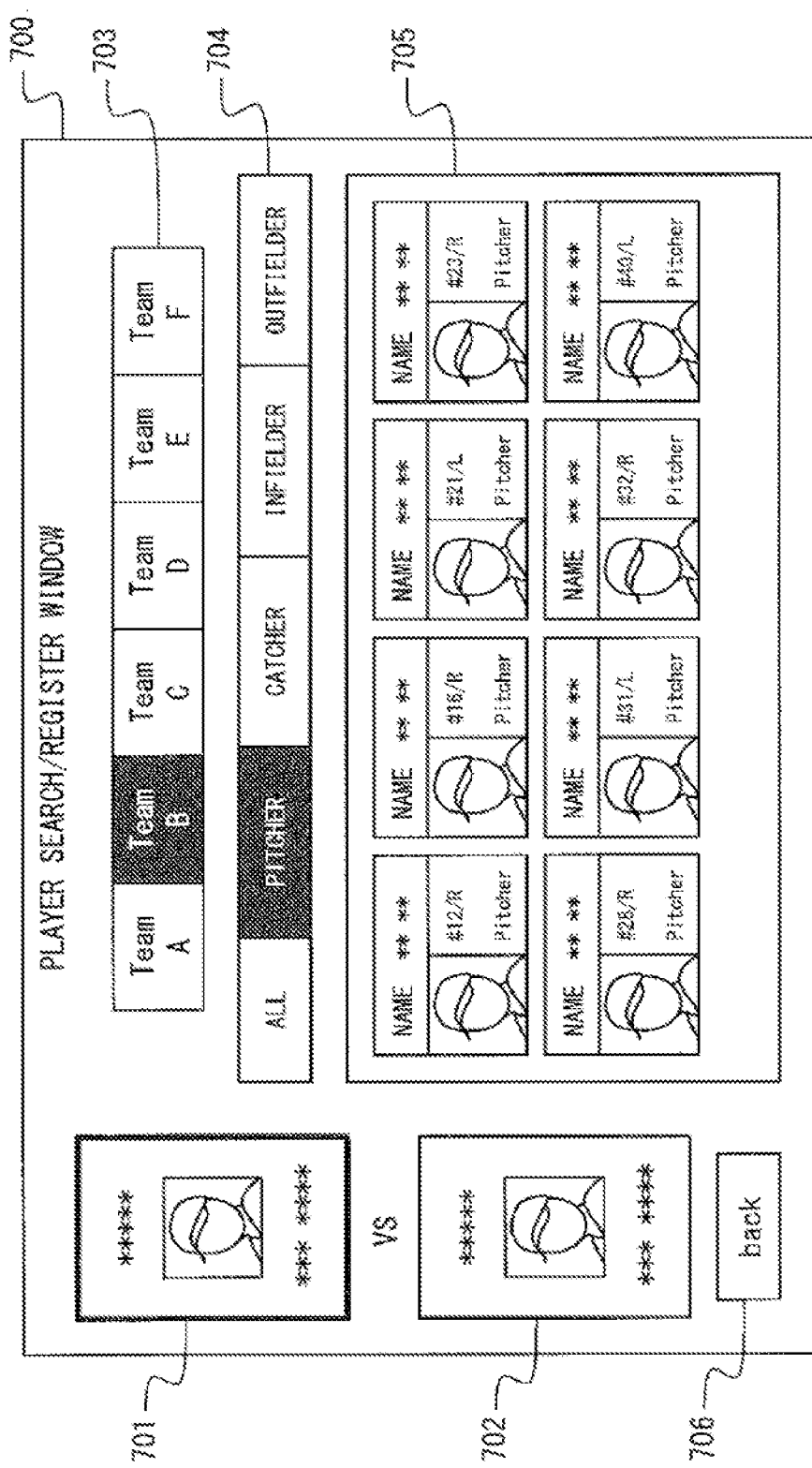
FIG. 14 illustrates an example of a player selection window.

FIG. 14 illustrates an example of a player selection window.

When the operator of the video image reproduction device 3 conducts a manipulation of pushing one of the player display areas 601 and 602 in the video player window 6, the video image reproduction device 3 obtains from the distribution server 2 the web page of the window for selecting a player. Also, the display unit 360 of the video image reproduction device 3 displays a player selection window 700 for example as illustrated in FIG. 14.

The player selection window 700 includes selected player display areas 701 and 702, a team selection area 703, a position selection area 704, a player display area 705 and a back button 706.

The selected player display areas 701 and 702 are areas for displaying selected players. The selected player display areas 701 and 702 function also as buttons for specifying a player, and when for example the operator conducts a manipulation of pushing the selected player display area 701, it becomes possible to select or change players to be displayed in the selected player display area 701.

The team selection area 703 is an area for selecting the team to which a player belongs, and six teams of team A through team F can be selected in the example illustrated in FIG. 13. The team selection area 703 functions also as a button for selecting (specifying) a team, and when for example the operator conducts a manipulation of pushing one of the six areas indicating the team names, that team name is specified.

The position selection area 704 is an area for selecting the position of a player and allows for the selection from among "all positions (ALL)", "pitcher", "catcher", "infielder" and "outfielder" in the example illustrated in FIG. 13. The position selection area 704 functions also as a button for selecting (specifying) a position and when for example the operator conducts a manipulation of pushing one of the five areas, the position of the player is selected.

The player display area 705 is an area for displaying players registered for the position selected on the selected team. The player display area 705 displays player information including the name, the uniform number, throwing and hitting right or left handedness (i.e. right-left information, which represents whether the player is right-handed or left-handed for throwing and batting), a face photograph, etc. of a corresponding player. Player information is stored in for example the web page storage unit 230 of the distribution server 2. Each piece of player information functions also as a button for selecting a player so that when the operator conducts a manipulation of selecting one piece of player information, the corresponding player is displayed in the selected player display area 701 or the selected player display area 702.

The back button 706 is a display switch button for switching the display of the display unit 360 of the video image reproduction device 3 to the video player window 6 in a case when a combination of selected players is confirmed, or in other cases.

Also, when the operator conducts a manipulation of pushing the game date display areas 603 and 604, the pitched-ball location display area 605, the type-of-pitch display area 606 and the batted-ball direction display area 607, the selection windows corresponding to the respective manipulations are displayed in the display unit 360 of the video image reproduction device 3. When the operator selects (specifies) a search condition through a prescribed manipulation and thereafter conducts a manipulation of pushing a back button displayed in each selection window, the search conditions are confirmed and the display of the display unit 360 of the video image reproduction device 3 is switched to the video player window 6.

In response to the input of various types of search conditions as described above, the video image reproduction device 3 transmits to the distribution server 2 a search request including the input search conditions.

Receiving the search request, the distribution server 2 searches the scene information 241 of the scene information storage unit 240 on the basis of the search conditions included in the search request. When scene information meeting the search conditions has been extracted from the scene information storage unit 240, the distribution server 2 transmits the extracted scene information to the video image reproduction device 3. Thereafter, the video image reproduction device 3 makes the display unit 360 display the received scene information and obtains the segment file including the head of the corresponding scene on the basis of the received scene information, as illustrated in FIG. 11. In other words, before receiving a reproduction instruction of a video image, the video image reproduction device 3 reads in advance the segment file including the head of a scene corresponding to the search result (scene information) displayed in the search result display area 608 of the video player window 6 illustrated in for example FIG. 13. Accordingly, when the operator selects scene information displayed in the search result display area 608 and conducts a manipulation of pushing the play button 610, the video image reproduction device 3 starts the reproduction of the segment file of the head of the scene stored in its own storage unit 340.

Also, regarding video image data held by the distribution server 2, a segment file of the head of a scene has a short time length, as in the second segment file group 502 illustrated in FIG. 2. This makes it possible to suppress transfer delay etc. of a segment file that is to be read in advance, even when a plurality of scenes meeting search conditions are extracted. Accordingly, compared with a case where it is requested, after the operator conducts a manipulation of starting the reproduction, that the distribution server 2 transmit a segment file of the head of a scene, a waiting time between the manipulation of starting the reproduction and the start of the reproduction can be reduced.

Also, regarding video image data held by the distribution server 2, only a prescribed number of segment files counting from the segment file including the head of a scene have time lengths shorter than the time length of the segment file to be reproduced next to such segment files. In other words, segment files with a short time length are transferred only once through several times of counting from the head of a scene, and accordingly an increase in the transfer frequency of segment files between the distribution server 2 and the video image reproduction device 3 can be suppressed. Accordingly, in the video image distribution system 1 of the present embodiment, it is possible to prevent a situation where an increase in the transfer frequency of segment files increases process loads on the distribution server 2.

Further, as illustrated in FIG. 10, the storage unit 340 of the video image reproduction device 3 makes the search result storage unit 342 store the scene information and the head file and makes the video image data storage unit 343 store subsequent segment files in the video image being reproduced. Accordingly, even when for example video image data (segment files) obtained from the distribution server 2 in the streaming distribution is deleted from the video image data storage unit 343 after the reproduction, the segment file of the head of a scene corresponding to a search result is held. This makes it possible to start the reproduction from the segment file of the head of a scene held by the video image reproduction device 3 itself even when a manipulation is conducted to reproduce a different video image.

Note that when the segment file of the head of a scene is to be obtained on the basis of scene information at the moment when the scene information meeting a search condition is obtained as in the present embodiment, the number of segment files to be obtained increases in proportion to the number of pieces of scene information that meets the search condition. This leads to a possibility that processes of obtaining the segment files of the heads of scenes in the video image reproduction device 3 will concentrate so as to increase the process loads when there are a large number of pieces of scene information that meet the search condition. In response to this, the video image reproduction device 3 may performs the processes as illustrated in FIG. 15A and FIG. 15B so as to obtain the segment file of the head of a scene at the moment when the scene information is displayed in the search result display area 608.

Figure 15A:
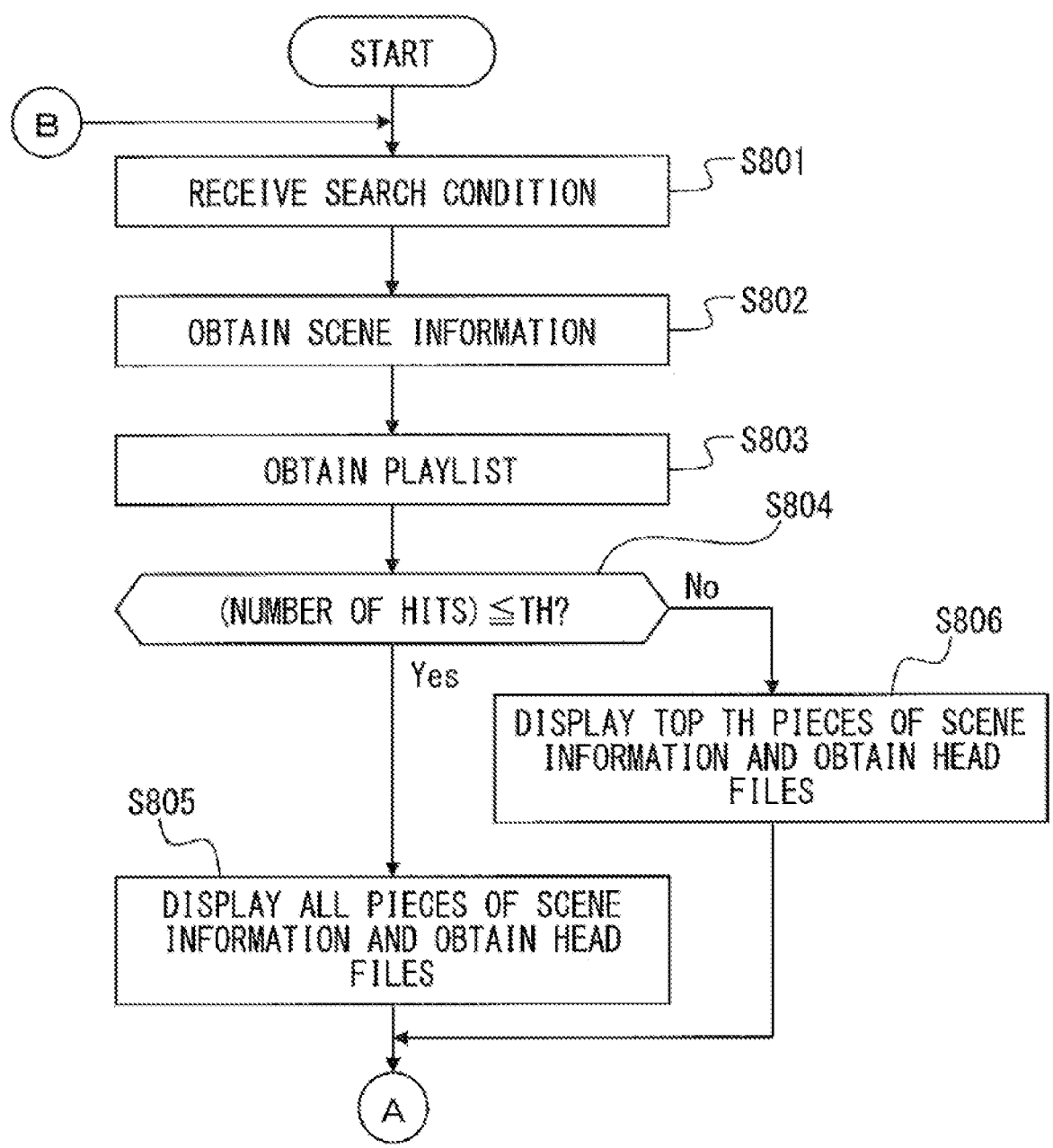
FIG. 15A is a flowchart for explaining a different example of a method of reading a head file in advance (first)
Figure 15B:
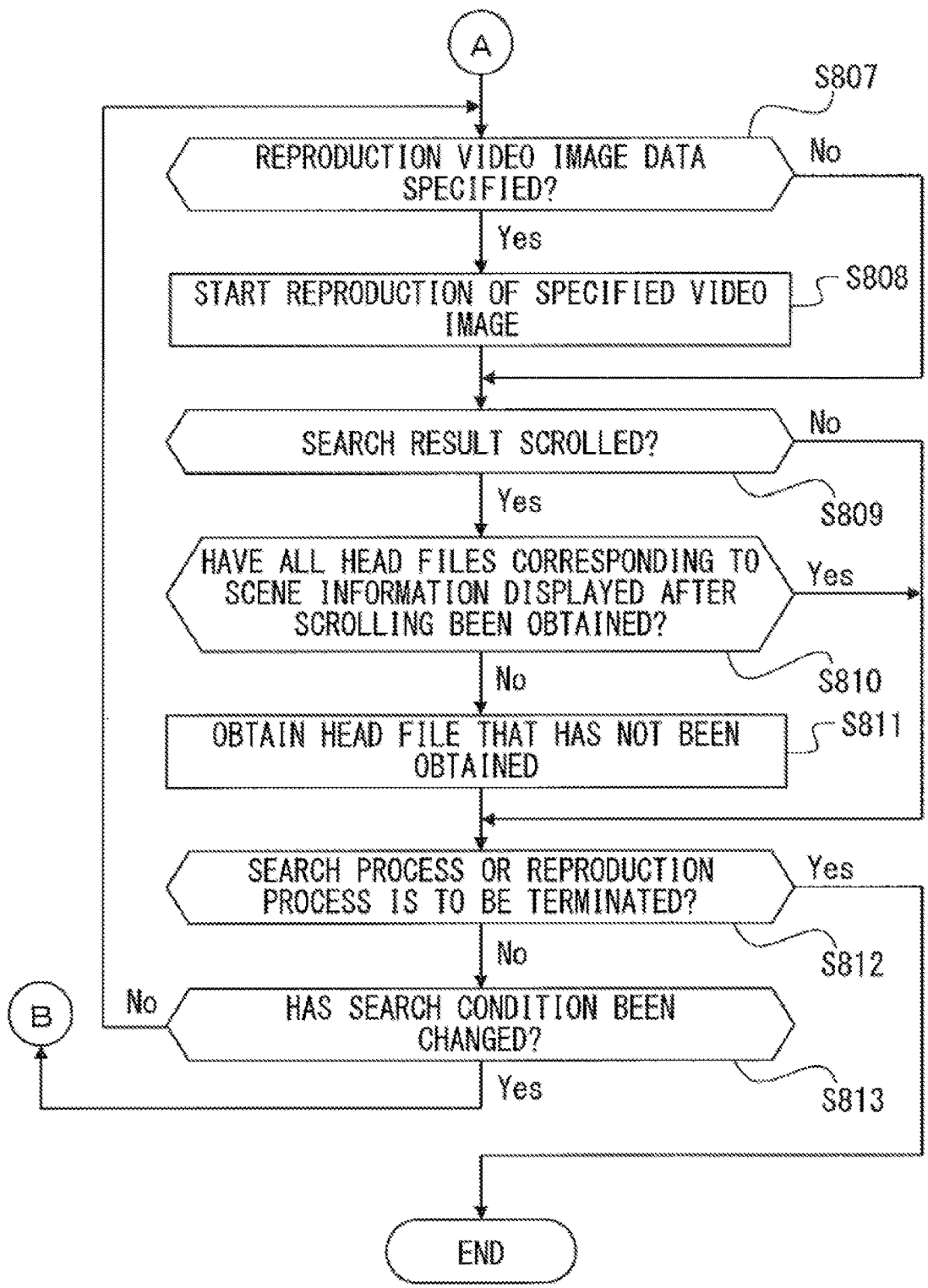
FIG. 15B is a flowchart for explaining a different example of a method of reading a head file in advance (second)

FIG. 15A is a flowchart for explaining a different example of a method of reading a bead file in advance (first). FIG. 15B is a flowchart for explaining a different example of a method of reading a head file in advance (second).

As illustrated in FIG. 15A, the video image reproduction device 3 first receives a search condition (step S801). Next, the video image reproduction device 3 transmits the search condition to the distribution server 2 and obtains scene information that meets the search condition (step S802). Next, the video image reproduction device 3 obtains a playlist on the basis of the obtained scene information (step S803). When a plurality of pieces of scene information have been obtained in step S802, the video image reproduction device 3 sequentially obtains the playlists of the respective pieces of obtained scene information.

Next, the video image reproduction device 3 determines whether or not the number of the pieces of obtained scene information, i.e., the number of the search hits, is equal to or smaller than threshold TH (step S804). Threshold TH used for the determination in step S804 is assumed to be the number of the pieces of scene information that can be displayed in the search result display area 608 of the video player window 6 at a time. This threshold TH may be a fixed value or may be a value that varies in accordance with the display size etc. of the video player window 6.

When the number of the hits is equal to or smaller than threshold TH (Yes in step S804), the video image reproduction device 3 displays all the pieces of obtained scene information and obtains the head files corresponding to each of all scene informations (step S805). When the number of the hits is greater than threshold TH (No in step S804), the video image reproduction device 3 displays TH (counting from the top) pieces of obtained scene information and obtains the head files corresponding to each of displayed scene informations (step S806). In step S806, the video image reproduction device 3 treats for example the first through TH-th pieces of scene information in the order of being obtained as top TH pieces of scene information.

Thereafter, the video image reproduction device 3 determines whether or not a video image that is to be reproduced has been specified, as illustrated in FIG. 15B (step S807). When a video image has been specified (Yes in step S807), the video image reproduction device 3 starts the reproduction of the specified video image (step S808). Also at that moment, the video image reproduction device 3 determines whether or not a manipulation of scrolling the search result has been conducted (step S809). When a video image has not been specified (No in step S807), the video image reproduction device 3 skips the process in step S808 so as to perform the determination in step S809.

When a manipulation of scrolling the search result has been conducted (Yes in step S809), the video image reproduction device 3 determines whether or not all the head files corresponding to the scene information displayed consecutively after the scrolling have already been obtained (step S810). When there is a piece of scene information for which a head file has not been obtained (No in step S810), the video image reproduction device 3 obtains a head file that has not been obtained (step S811). After obtaining a head file that has not been obtained, the video image reproduction device 3 determines whether or not to terminate the search (step S812).

When a manipulation of scrolling the search result has not been conducted (No in step S809), the video image reproduction device 3 skips the determination in step S810 and the process in step S811 so as to conduct the determination in step S812. When a manipulation of scrolling was conducted but all the head files corresponding to the pieces of the scene information that are being displayed currently have been obtained (Yes in step S810), the video image reproduction device 3 skips the process in step S811 and conducts the determination in step S812.

In step S812, the video image reproduction device 3 determines for example whether or not a manipulation of pushing the home button 613 in the video player window 6 has been conducted. When the search is to be terminated (Yes in step S812), the video image reproduction device 3 terminates the search process.

When the search is to be continued (No in step S812), the video image reproduction device 3 determines whether or not the search condition has been changed (step S813). When the search condition has been changed (Yes in step S813), the process performed by the video image reproduction device 3 returns to step S801 illustrated in FIG. 15A. When the search condition has not been changed (No in step S813), the process performed by the video image reproduction device 3 returns to step S807. Thereafter, the video image reproduction device 3 repeats the processes from step S801 through step S813 until the search is terminated.

As described above, in the method of reading a head file in advance illustrated in FIG. 15A and FIG. 15B, only segment files of the heads of the scenes corresponding to the scene information displayed in the display unit 360 of the video image reproduction device 3 are sequentially obtained from among pieces of scene information that meet the search condition. This can suppress an increase in the process loads on the video image reproduction device 3 caused by obtaining many segment files in a case when many pieces of scene information meeting the search condition have been extracted.

Note that the flowchart illustrated in FIG. 15A and FIG. 15B is just exemplary, and the order and content of some of the processes may be changed as needed. Step S803 of obtaining a playlist for example may be included in step S805 or step S806 so that only a playlist identified by scene information displayed in the search result display area 608 of the video player window 6 is obtained.

Also, the video player window 6 displayed in the display unit 360 of the video image reproduction device 3 is not limited to the layout exemplified by FIG. 13 and can be changed appropriately. The video player window 6 for example may display thumbnail images of respective scenes together with scene information in the search result display area 608 as illustrated in FIG. 16.

Figure 16:
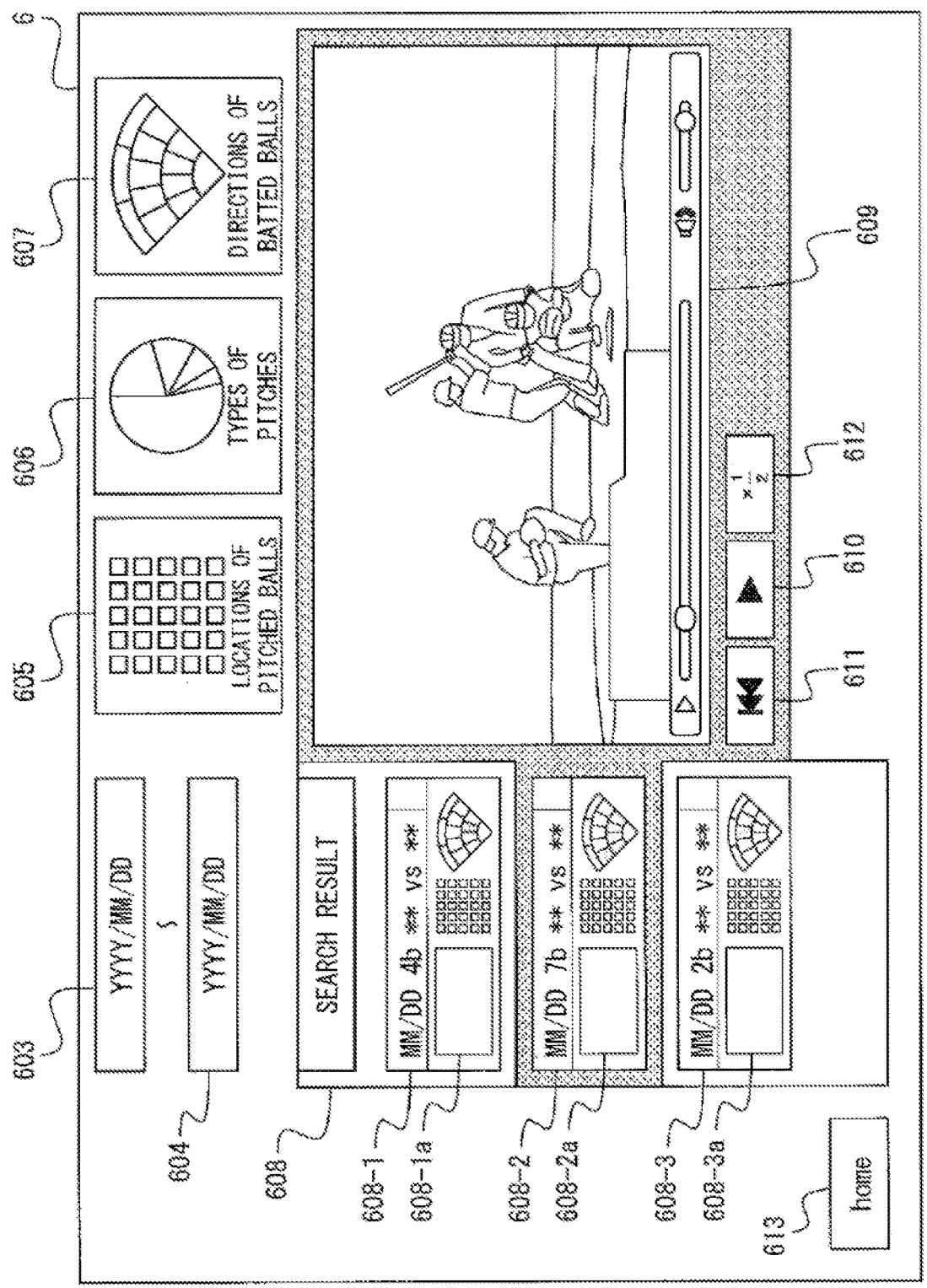
FIG. 16 illustrates a different example of a video player window.
Figure 17:
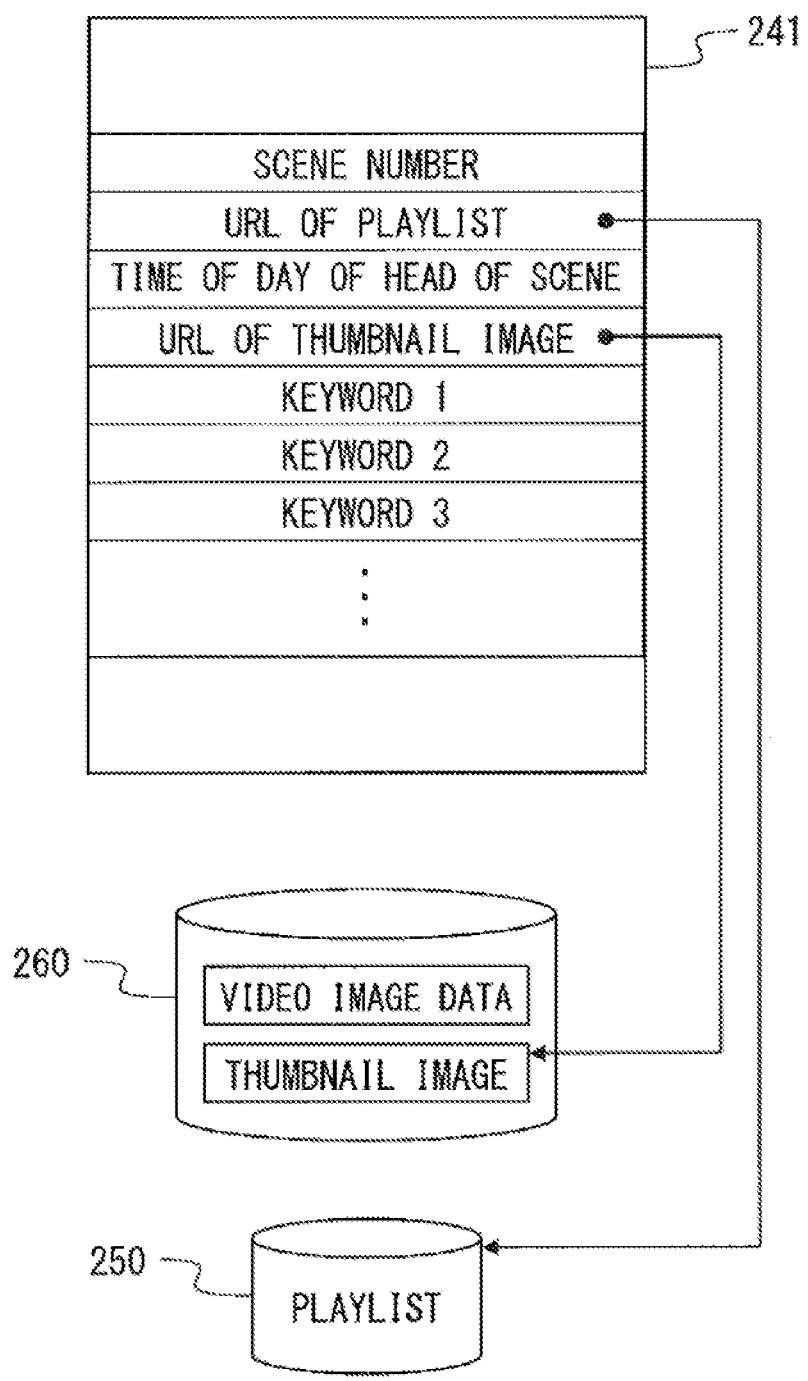
FIG. 17 illustrates a configuration example of scene information for a case when thumbnail images are displayed.

FIG. 16 illustrates a different example of a video player window. FIG. 17 illustrates a configuration example of scene information for a case when thumbnail images are displayed. Note that FIG. 16 illustrates a search window for a case when the video image of a baseball game is reproduced (viewed) as an example of the video player window 6. Similarly to the video player window 6 illustrated in FIG. 13, this video player window 6 includes the game date display areas 603 and 604, the pitched-ball location display area 605, the type-of-pitch display area 606 and the batted-ball direction display area 607. Also, the video player window 6 includes the search result display area 608, the video image display area 609, the play button 610, the back-to-head button 611, the slow motion button 612 and the home button 613. Further, the video player window 6 includes the player display areas 601 and 602, which are omitted in FIG. 16.

In the search result display area 608 of the video player window 6, scene information meeting the search condition is displayed for each scene as described above. In the above process, for the pieces of scene information 608-1, 608-2 and 608-3 of the respective scenes, thumbnail images 608-1a, 608-2a and 608-3a of each scene may be respectively displayed as illustrated in FIG. 16. For the thumbnail images 608-1a, 608-2a and 608-3a, images generated by extracting the frames of the heads of the respective scenes in video image data (segment file group) for example are used. These thumbnail images 608-1a, 608-2a and 608-3a are stored in for example the video image data storage unit 260 of the distribution server 2 together with the video image data.

Also, when thumbnail images are displayed together with scene information in the video player window 6, the URL of a thumbnail image is registered in the scene information of each scene as in for example the scene information 241 illustrated in FIG. 17.

When the URLs of thumbnail images have been registered in scene information, the control unit 320 of the video image reproduction device 3 obtains the thumbnail images at the same time as for example the process of obtaining the head file illustrated in FIG. 11 (steps S210 and S211). Also, when making the display unit 360 display the scene information obtained in step S213, the control unit 320 makes the display unit 360 also display the thumbnail images. Also, the control unit 320 may make the storage unit 340 store the thumbnail images together with the scene information and the head file in step S212.

Note that the thumbnail images 608-1a, 608-2a and 608-3a may extract and generate not only a frame of the head of each scene but also other frames in video image data. When for example respective scenes are set in units of pitches by a pitcher in video image data of a baseball game, a thumbnail image generated by extracting the frame of the head of each scene is one at the moment when the pitcher started the pitching action. In such a case, the thumbnail images of respective scenes have roughly the same composition, which may result in a situation where it is difficult to discriminate scenes by thumbnail images. In response to this situation, in a case when respective scenes are set in units of pitches by the pitcher, it is also possible to use as a thumbnail image a frame for example before the pitcher starts the pitching action, which is slightly earlier in time than the head of the scene.

Figure 18:
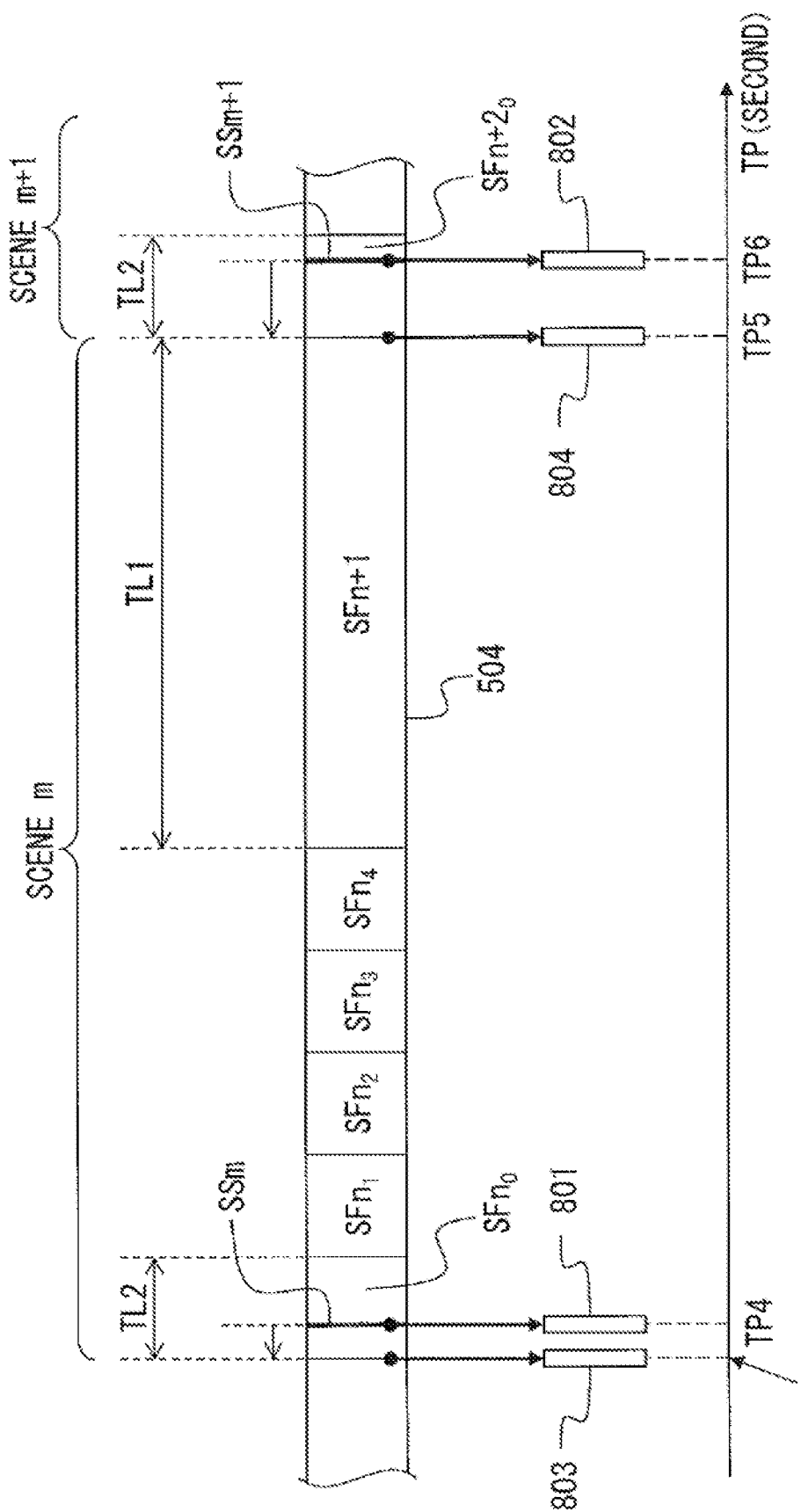
FIG. 18 explains a generation method of a thumbnail image.

FIG. 18 explains a generation method of a thumbnail image.

When respective scenes are set in units of pitches by a pitcher, frame SSm of the head of scene m and frame SSm+1 of the head of next scene m+1 in the video image data (segment file group) 504 illustrated in FIG. 18 for example both have a composition in which the pitcher has just started the pitching action. This may result in a situation where the thumbnail images 801 and 802 generated by extracting the frames of the heads of scenes SSm and SSm+1 have roughly the same composition and it is difficult to discriminate scenes by the thumbnail images 801 and 802.

Thus, when the frames of the heads of scenes have roughly the same composition, the first frames in the segment files including the frames of the heads of the scenes are used as the thumbnail images as illustrated in for example FIG. 18. The first frame in segment file $SFn_0$ including frame SSm of the head of scene m and the first frame in segment file $SFn+2_0$ including frame SSm+1 of the head of scene m+1 are frames of moments before the pitcher started the pitching action. In addition, difference TP4-TP3 in time of day between frame SSm of the head of scene m and the first frame of segment file $SFn_0$ is shorter than difference TP6-TP5 in time of day between frame SSm+1 of the head of scene m+1 and the first frame of segment file $SFn+2_0$ including that frame. Accordingly, it is highly likely that the first frame of segment file $SFn_0$ including the frame of the head of scene m has a composition different from that of the first frame of segment file $SFn+2_0$ including frame SSm+1 of the head of scene m+1. In other words, it is highly likely that a thumbnail image 803 generated by extracting the first frame of segment file $SFn_0$ has a composition different from that of a thumbnail image 804 generated by extracting the first frame of segment file $SFn+2_0$. Accordingly, using the first frame in a segment file including the frame of the head of a scene as a thumbnail image of each scene is more likely to result in differences between the compositions between thumbnail images, making it easier to discriminate scenes by using thumbnail images.

Note that when a frame earlier in time than the frame of the head of a scene is to be treated as a thumbnail image, not only the first frame of the segment file including the frame but also a frame further earlier in time may be treated as a thumbnail image.

Also, in a case of a segment file group in which video image data is divided so that the frame of the head of a scene is the head of the segment file, the frame one second earlier than the frame of the head of the scene for example may be treated as a thumbnail image.

It is also possible to employ a configuration in which for example when a video image of a baseball game is searched for by using the video image reproduction device 3, games that one of the players selected in the video player window 6 is appearing in can be searched for.

For example, the video player window 6 can include a game search button (not illustrated) in addition to the player display areas 601 and 602, the game date display areas 603 and 604, the pitched-ball location display area 605, etc. illustrated in FIG. 13. The game search button is a button for switching the display of the display unit 360 from the video player window 6 to a window for searching for a game that a particular player is appearing in. When the operator of the video image reproduction device 3 conducts a manipulation of pushing the game search button, the control unit 320 of the video image reproduction device 3 makes the display unit 360 display for example a played game selection window (game-with-appearance selection window) 720 as illustrated in FIG. 19.

Figure 19:
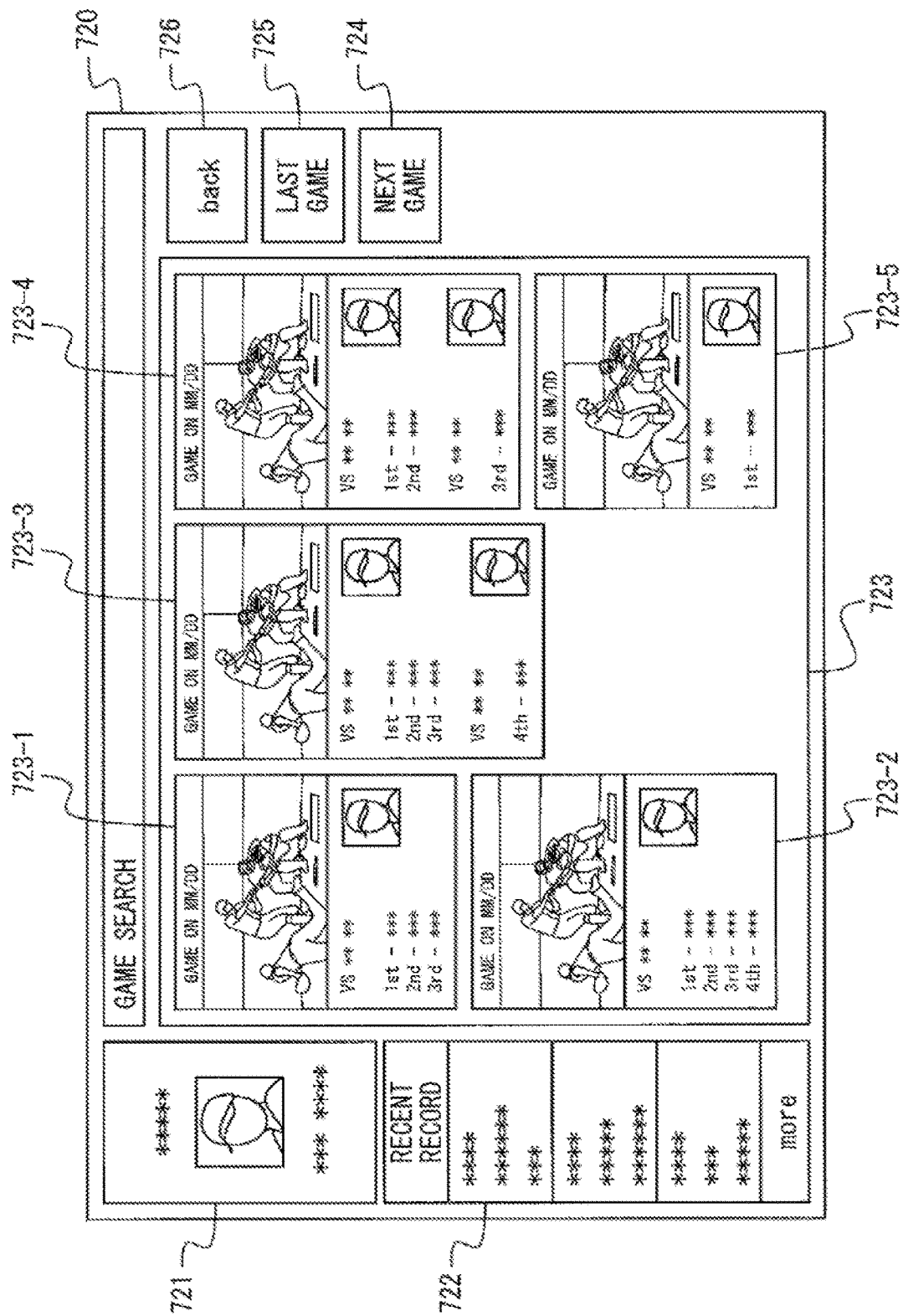

FIG. 19 illustrates an example of search results of games that a particular player is appearing in.

The played selection window 720 includes a player display area 721, a record display area 722, a game information display area 723, a first button 724, a second button 725 and a back button 726.

The player display area 721 is an area for displaying a selected player. This player display area 721 functions also as a button for specifying a player, and when for example the operator conducts a manipulation of pushing the player display area 721, the display is switched to the player selection window 700 as illustrated in FIG. 14.

The record display area 722 is an area for displaying the records of a selected player. Records of players are stored in the web page storage unit 230 of the distribution server 2 in a state in which each record is associated with a piece of player information displayed in the player selection window 700.

The game information display area 723 is an area for displaying information on games that a selected player appeared in (pieces of game information 723-1, 723-2, 723-3, 723-4 and 723-5). Game information includes information on for example the date of the game, the opponent, the batting record in the game, etc. Game information is stored in for example the web page storage unit 230 of the distribution server 2 in a state in which it is associated with players displayed in the player selection window 700. Also, together with game information, a thumbnail image generated from the video image data of that game may be displayed. When thumbnail images are displayed, frames at times of day that are different from the heads of scenes may be used for thumbnail images so as to prevent the thumbnail images from having roughly the same composition between pieces of game information. The pieces of game information 723-1, 723-2, 723-3, 723-4 and 723-5 displayed in the game information display area 723 function also as buttons for specifying a piece of video image data (game) that is to be reproduced.

The first button 724 is a display switch button for switching the display of the appearance game selection window 720 to game information that is not being displayed currently. The second button 725 is a display switch button for making the played game selection window 720 display the game information of the last game that the selected player appeared in. The back button 726 is a display switch button for returning the display of the played game selection window 720 to the video player window 6.

When the operator conducts a manipulation of pushing the game search button (not illustrated) in a state in which the video player window 6 is displayed in the display unit 360 of the video image reproduction device 3, the display unit 360 displays the played game selection window 720. Note that at the moment when the played game selection window 720 is displayed, the player display area 721 and the record display area 722 are blank and the pieces of the game information 723-1, 723-2, 723-3, 723-4 and 723-5 are not displayed in the game information display area 723.

Thereafter, when an operator conducts a manipulation of pushing the player display area 721, the display unit 360 of the video image reproduction device 3 displays the player selection window 700 as illustrated in FIG. 14. When the operator conducts a manipulation of selecting and confirming a player, the player selection window 700 for example disappears, and the selected player is displayed in the player display area 721 of the played game selection window 720 and a recent record of that player is displayed in the record display area 722.

Then, the video image reproduction device 3 transmits to the distribution server 2 a search request in which the name of the player displayed in the player display area 721 is used as a search condition, and obtains information on a video image in which that player appeared. The video image reproduction device 3 displays the obtained information in the game information display area 723 as game information. When the operator conducts a manipulation of pushing one of the pieces of the game information 723-1, 723-2, 723-3, 723-4 and 723-5, the search process as illustrated in FIG. 11 is performed between the distribution server 2 and the video image reproduction device 3. In the search process performed then, the video image reproduction device 3 first transmits to the distribution server 2 a search request in which the name of a pitcher appearing in the game identified by the pushed game information and the name of a player displayed in the player display area 721 are search conditions. Thereafter, the search process illustrated in FIG. 11 is performed between the video image reproduction device 3 and the distribution server 2, and the display unit 360 of the video image reproduction device 3 displays the video player window 6 including scene information that meets the search condition.

Note that the played game selection window 720 illustrated in FIG. 19 is an example of a window for selecting a game in which a selected player was at bat. The played game selection window 720 is not limited to this and may be for example a window for selecting a game in which a selected player (pitcher) pitched.

Figure 20:
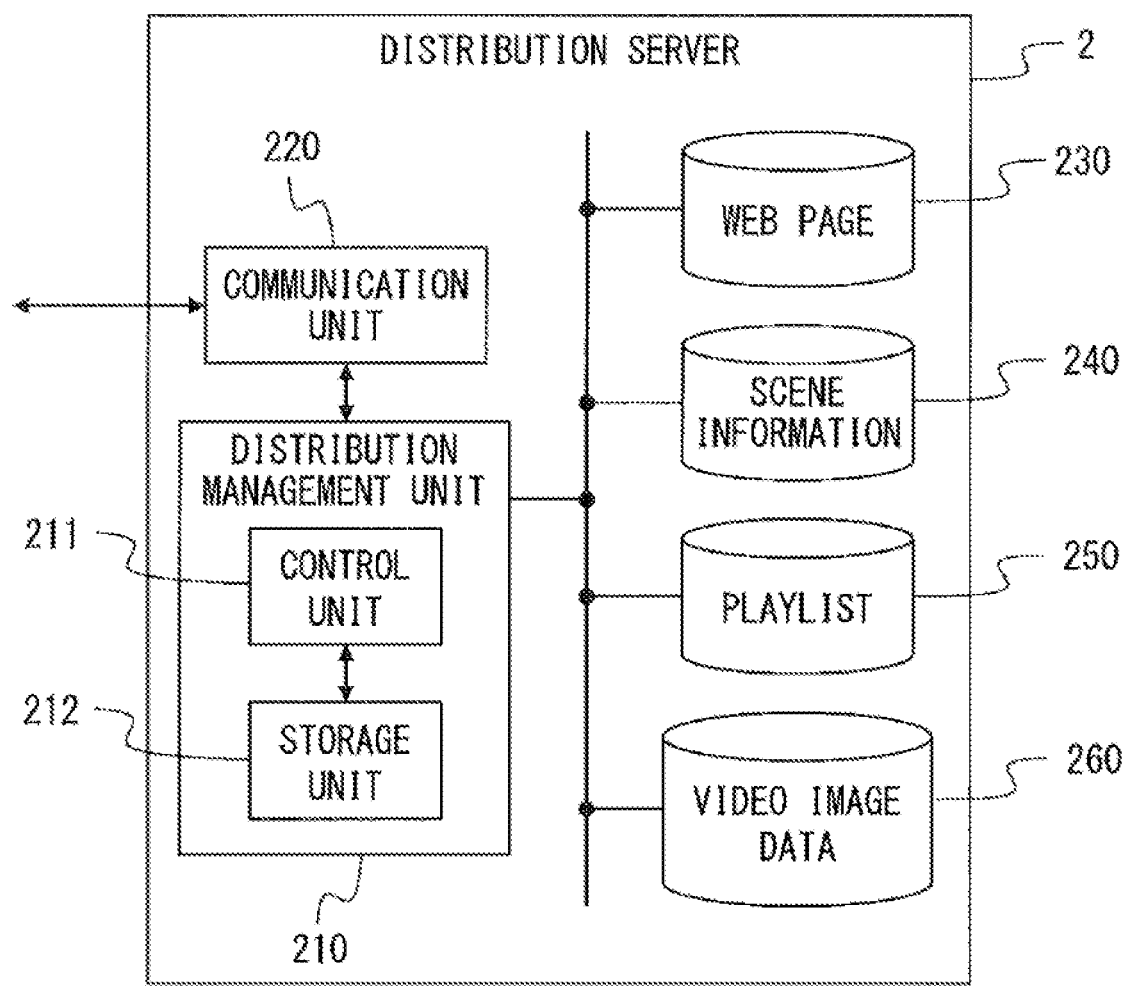
FIG. 20 illustrates a functional configuration of a distribution server in the video image distribution system according to a second embodiment.

FIG. 20 illustrates a functional configuration of a distribution server in the video image distribution system according to a second embodiment.

As illustrated in FIG. 20, the distribution server 2 according to the present embodiment includes the distribution management unit 210, the communication unit 220, the web page storage unit 230, the scene information storage unit 240, the playlist storage unit 250 and the video image data storage unit 260.

The distribution management unit 210 conducts the management of video image data (segment file group) distributed by the distribution server 2, the management of the transmission of segment files to the video image reproduction devices 3, and other processes. Also, the distribution management unit 210 of the distribution server 2 according to the present embodiment includes a control unit 211 and a storage unit 212. The control unit 211 of the distribution management unit 210 performs various processes including a search process in accordance with a search request from the video image reproduction device 3 and a distribution process in accordance with a distribution request from the video image reproduction device 3. The storage unit 212 of the distribution management unit 210 stores a search result (scene information) transmitted to the video image reproduction device 3 and a segment file of the head of a scene identified by that scene information.

The communication unit 220 performs communications with the video image reproduction devices 3 via the communication network 4. The web page storage unit 230 stores a web page such as a video player window, a search window, etc., to be displayed in the video image reproduction devices 3. The scene information storage unit 240 stores for example scene information 241 illustrated in FIG. 8 as scene information of respective pieces of video image data (segment file group) used for searching for video images. The playlist storage unit 250 stores playlists of respective pieces of video image data illustrated in FIG. 5. The video image data storage unit 260 stores video image data.

Figure 21:
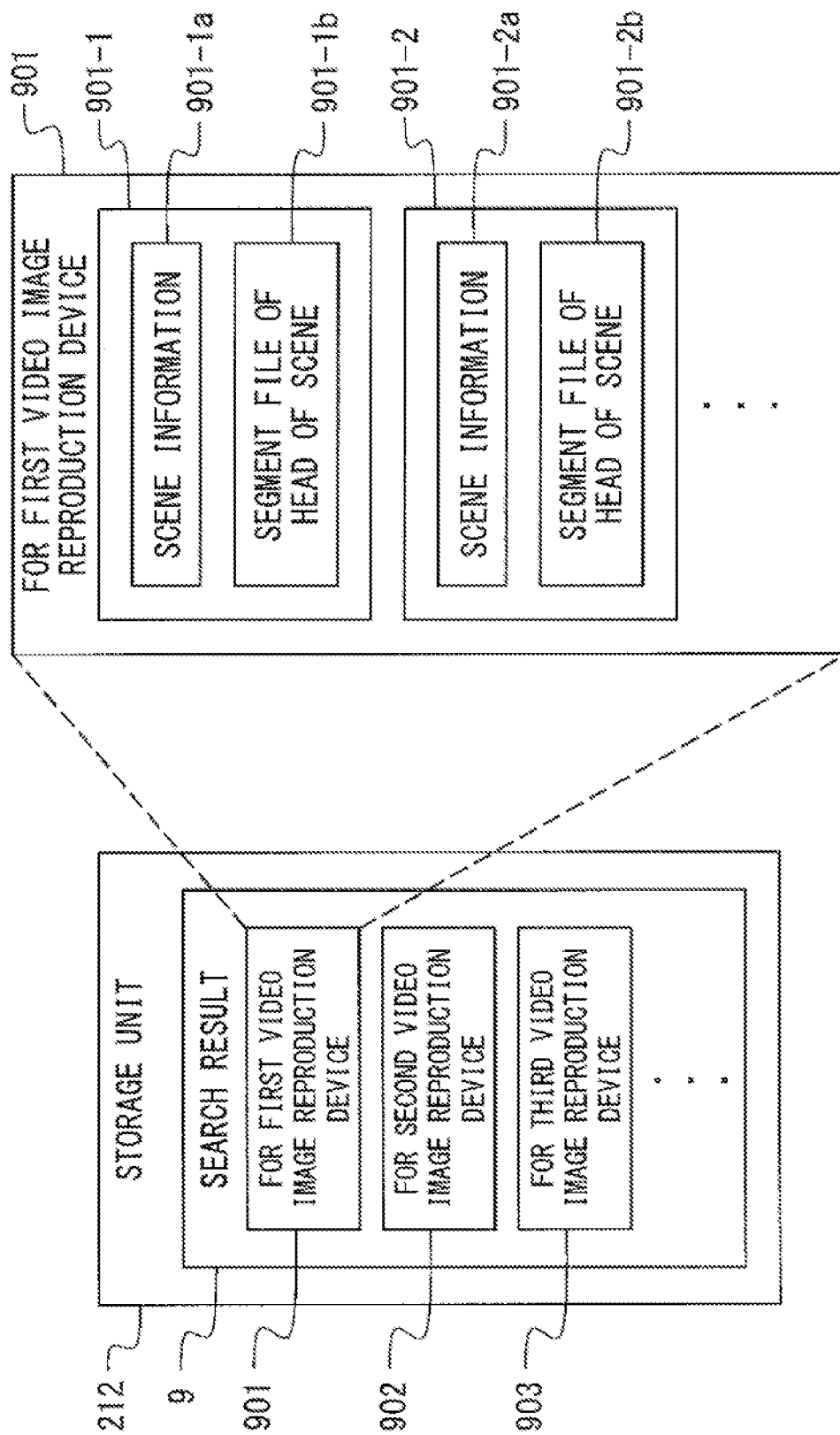
FIG. 21 illustrates a configuration of a storage unit of a distribution management unit in the distribution server according to the second embodiment.

FIG. 21 illustrates a configuration of a storage unit of a distribution management unit in the distribution server according to the second embodiment.

The storage unit 212 of the distribution management unit 210 stores a search result (scene information) transmitted to the video image reproduction device 3 and the segment file of the head of the scene identified by that scene information as described above. The storage unit 212 includes a search result storage unit 9 as illustrated in FIG. 21. The search result storage unit 9 stores search results 901, 902 and 903 for each of the video image reproduction devices 3 (for each client). In this example, regarding a search result for one of the video image reproduction devices 3, a pair of a piece of scene information meeting a search condition and the segment file of the head of the scene identified by that scene information is stored in the search result storage unit as one search result. The segment file of the head of a scene is identified on the basis of the URL of a playlist included in the scene information and the time of day of the head of the scene.

FIG. 21 illustrates a configuration of the search result 901 for the first video image reproduction device as an example of a search result stored in the storage unit 212. The search result 901 includes a first search result 901-1 and a second search result 901-2.

The first search result 901-1 includes scene information 901-1a that meets a search condition and a segment file 901-1b of the head of the scene identified by that scene information 901-1a. Also, the second search result 901-2 includes different scene information 901-2a that meets a search condition and a segment file 901-2b of the head of the scene identified by that scene information 901-2a.

Figure 22:
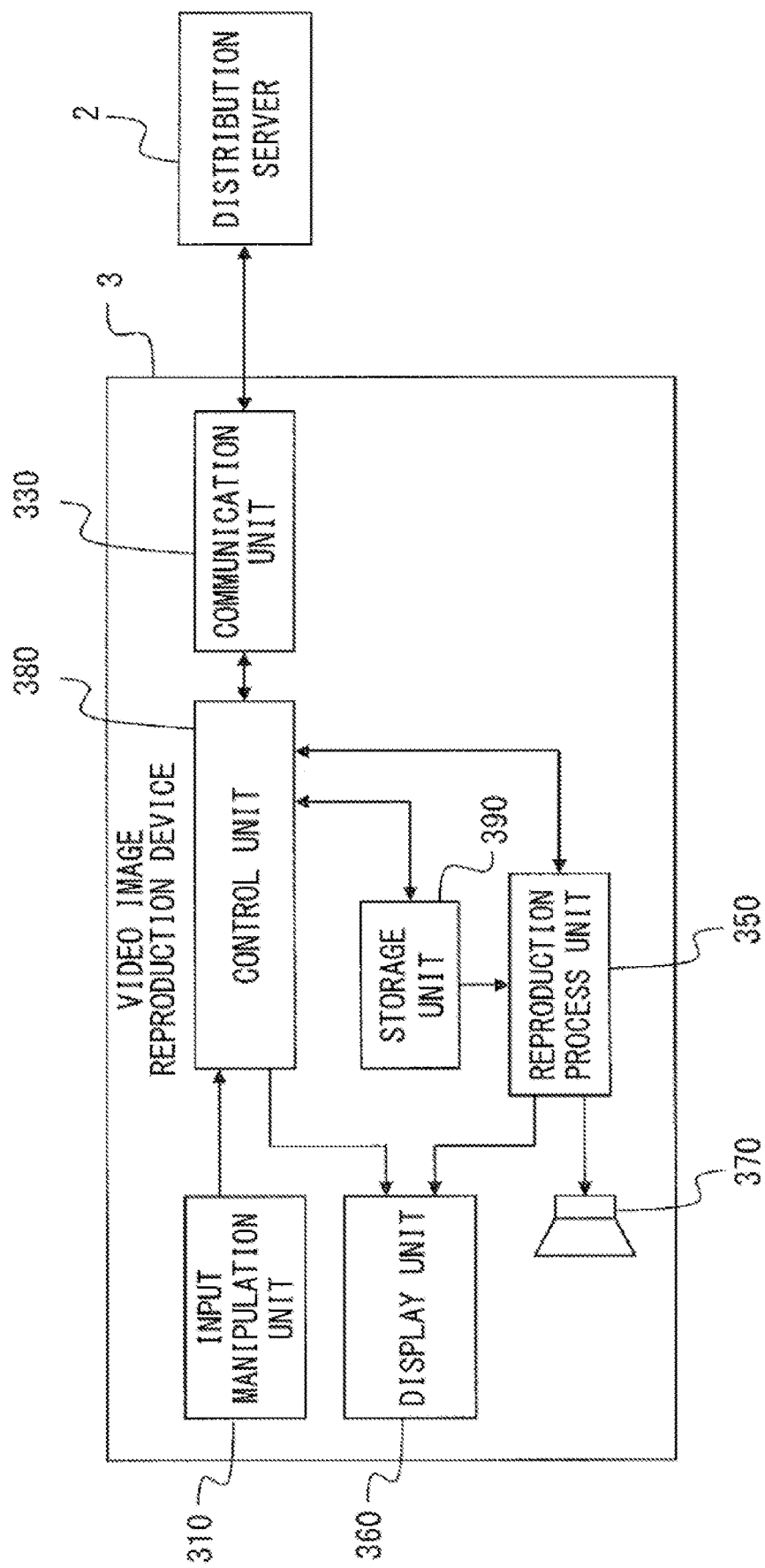
FIG. 22 illustrates a functional configuration of a video image reproduction device in the video image distribution system according to the second embodiment.

FIG. 22 illustrates a functional configuration of a video image reproduction device in the video image distribution system according to the second embodiment.

As illustrated in FIG. 22, the video image reproduction device 3 according to the present embodiment includes the input manipulation unit 310, a control unit 380, the communication unit 330, a storage unit 390, the reproduction process unit 350, the display unit 360 and the speaker 370.

The input manipulation unit 310 receives various types of input manipulations such as an input manipulation conducted by the operator in order to view a video image or other manipulations. Input manipulations conducted by the operator include a manipulation of activating (executing) a program for viewing a video image, a manipulation of searching for a video image, and a manipulation of selecting a video image to view.

The control unit 380 controls the operation of the video image reproduction device 3 on the basis of an input manipulation received by the input manipulation unit 310. The operations controlled by the control unit 380 include an operation of transmitting the search request and a distribution request for a video image to the distribution server 2. The operations controlled by the control unit 380 include an operation of making the storage unit 390 store a search result (scene information) obtained from the distribution server 2, an operation of obtaining video image data (segment files) and an operation of making the reproduction process unit 350 perform the reproduction process of video image data.

The communication unit 330 conducts communications with the distribution server 2 via the communication network 4. The storage unit 390 stores a web page, scene information, video image data (segment files), etc. obtained from the distribution server 2. The reproduction process unit 350 performs a reproduction process etc. of a segment file stored in the storage unit 390. The display unit 360 displays a web page or a video image reproduced in the reproduction process unit 350. The speaker 370 outputs audio reproduced by the reproduction process unit 350.

FIG. 23 is a sequence diagram for explaining a search process in the video image distribution system according to the second embodiment.

Receiving a prescribed input manipulation by the operator in the input manipulation unit 310 for example, the video image reproduction device 3 makes the display unit 360 display a video player window for viewing a video image. A prescribed input manipulation by the operator includes for example a manipulation of activating a web browser and a manipulation of making the web browser display the web page of the video player window. As illustrated in for example FIG. 13, a video player window includes the player display areas 601 and 602, the game date display areas 603 and 604, the pitched-ball location display area 605, the search result display area 608, the video image display area 609, etc.

When the operator manipulates the input manipulation unit 310 and inputs a search condition in a state in which the video player window is displayed, a search request (search condition) transmitted from the video image reproduction device 3 to the distribution server 2 as illustrated in FIG. 23 (step S221).

In the distribution server 2 that has received the search request from the video image reproduction device 3, the control unit 211 searches the scene information 241 of the scene information storage unit 240 on the basis of the search condition (step S222). When the scene information 241 includes scene information that meets the search condition, the control unit 211 extracts that scene information and transmits it to the video image reproduction device 3 (steps S223 and S224). When the scene information 241 does not include scene information that meets the search condition, the distribution server 2 transmits to the video image reproduction device 3 information reporting that scene information meeting the search condition does not exist.

When scene information meeting the search condition has been extracted, the control unit 211 of the distribution server 2 identifies a playlist of the video image data on the basis of that scene information (step S225). In step S225, the control unit 211 reads the URL (see FIG. 8) of the playlist included in the scene information so as to identify the playlist of the video image data.

After identifying the playlist of the video image data, the control unit 211 of the distribution server 2 reads the playlist by accessing the playlist storage unit 250 (steps S226 and S227).

Reading the playlist, the control unit 211 of the distribution server 2 uses the scene information and the playlist so as to identify the segment file (head file) of the head of the scene that corresponds to the scene information (step S228). In step S228, the control unit 211 reads the time of day of the head of the scene included in the scene information and thereafter reads from the playlist the URL of the segment file including the time of day of the head of the scene.

After identifying the head file, the control unit 211 of the distribution server 2 obtains the head file by accessing the video image data storage unit 260 (steps S229 and S230).

Thereafter, the control unit 211 of the distribution server 2 makes the storage unit 212 store a pair of the scene information and the head file in a state in which it is associated with the video image reproduction device 3 (step S231).

As described above, in the video image distribution system 1 according to the present embodiment, when a scene search is conducted for a video image by using the video image reproduction device 3, the distribution server 2 reads in advance the segment file including the head of that scene on the basis of the search result (scene information). In other words, when a scene search has been conducted, the distribution server 2, before receiving a distribution request for video image data from the video image reproduction device 3, obtains the segment file including the head of the scene so as to be ready for the distribution. Then, the distribution server 2 holds the scene information and the segment file (head file) read in advance in a state in which they are associated to each other. In other words, in the video image distribution system 1 according to the present embodiment, the distribution server 2 holds a segment file, read in advance, that includes the head of a scene in association with the video image reproduction device 3 instead of transmitting it to the video image reproduction device 3 together with the scene information.

Note that when a plurality of pieces of scene information have been extracted in the processes in steps S222 and S223 performed by the control unit 211 of the distribution server 2, the control unit 211 performs the processes in step S224 through step S231 on each of the extracted pieces of scene information.

Also, when search requests (search conditions) of scenes have been received from the plurality of video image reproduction devices 3, the control unit 211 of the distribution server 2 performs the processes in step S222 through step S231 for each of the video image reproduction devices 3 and makes the storage unit 212 store a pair of scene information and a head file for each of the video image reproduction devices 3.

Figure 24A:
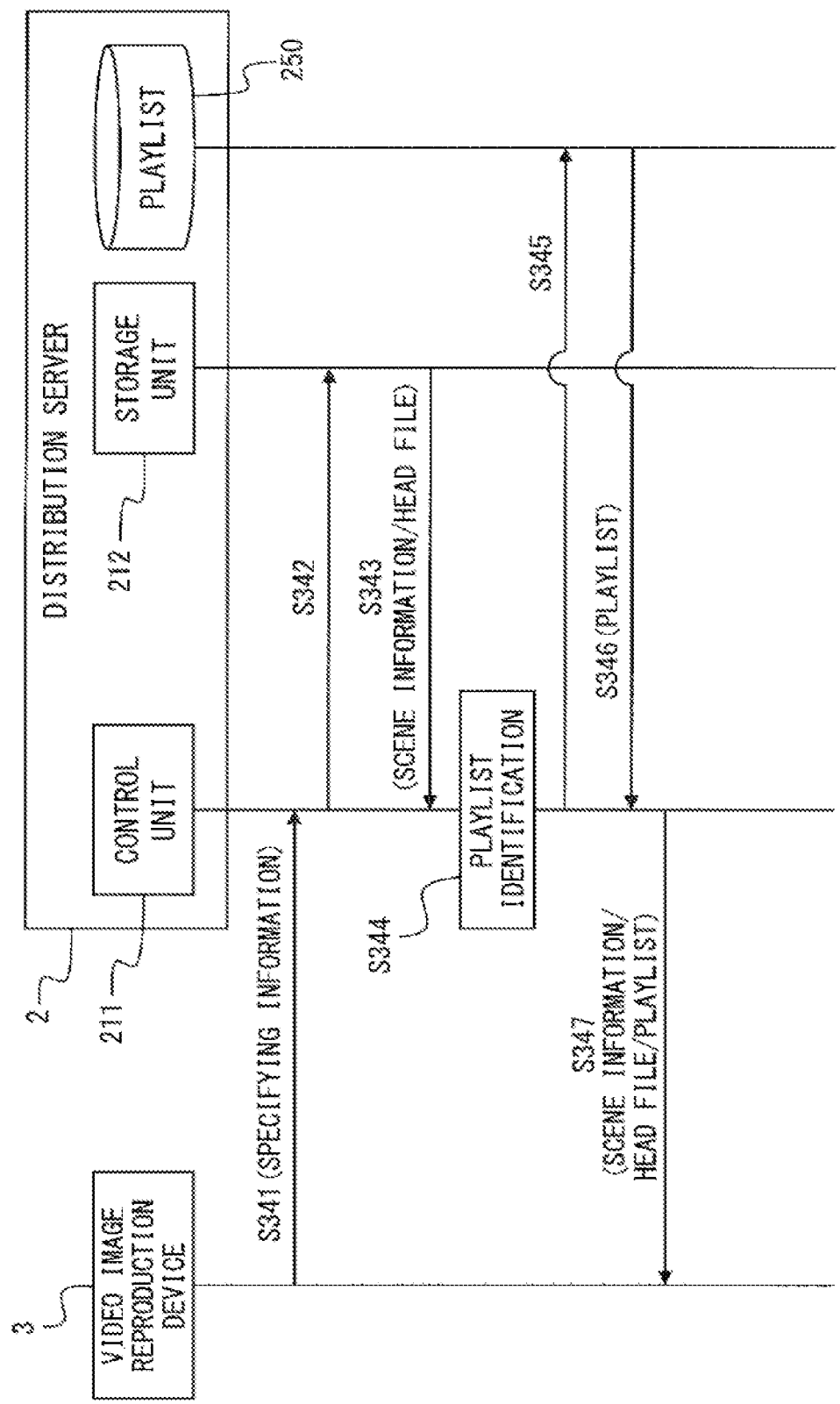
FIG. 24A is a sequence diagram for explaining a reproduction process of a video image in the distribution system according to the second embodiment (first)

FIG. 24A is a sequence diagram for explaining a reproduction process of a video image in the distribution system according to the second embodiment (first). FIG. 24B is a sequence diagram for explaining a reproduction process of a video image in the distribution system according to the second embodiment (second).

Receiving the search result (scene information) from the distribution server 2 by the process of step S224 above, the video image reproduction device 3 displays the search results in the video player window. When the operator conducts a manipulation of specifying a video image that is to be reproduced in the video image reproduction device 3 including the video player window displaying the search results, the video image reproduction device 3 transmits specifying information to the distribution server 2 as illustrated in FIG. 24A (step S341). Specifying information includes scene information of a video image that is to be reproduced.

In the distribution server 2 that has received the specifying information, the control unit 211 accesses the storage unit 212 and reads the scene information specified in the specifying information and the head file (steps S342 and S343).

Reading the scene information and head file, the control unit 211 identifies the playlist of the video image data that is to be transmitted (distributed) to the video image reproduction device 3 on the basis of the read scene information.

In step S344, the control unit 211 identifies the playlist by reading the URL (see FIG. 8) of the playlist included in the scene information.

After identifying the playlist, the control unit 211 accesses the playlist storage unit 250 so as to read the identified playlist (steps S345 and S346).

Reading the playlist, the control unit 211 transmits the scene information, the head file and the playlist to the video image reproduction device 3 (step S347).

In the video image reproduction device 3 that has received the scene information, the head file and the playlist, the control unit 380 outputs a reproduction start instruction and the head file to the reproduction process unit 350 (step S348) as illustrated in FIG. 24B. The reproduction process unit 350 starts the reproduction from the received head file (step S349), and outputs a reproduced signal to the display unit 360 and a speaker (not illustrated) (step S350).

The control unit 380, after outputting the reproduction start instruction, identifies the segment file (following file) that follows the head file being reproduced, on the basis of the scene information and the playlist (step S361). In step S361, on the basis of the time of day of the head of the scene included in the scene information, the control unit 380 of the video image reproduction device 3 reads the URL of a segment file that is later in time than the segment file for which the time of day of the head of a scene is included in the playlist.

After identifying the following file, the video image reproduction device 3 (the control unit 380) transmits to the distribution server 2 a transfer request for the segment file that is to be reproduced second (step S362). Receiving from the distribution server 2 the segment file that is to reproduced second, the control unit 380 of the video image reproduction device 3 makes the storage unit 390 store the received segment file (steps S363 and S364).

Also, the control unit 380 consecutively transmits to the distribution server 2 a transfer request for the segment file that is to be reproduced third (step S365). Receiving, from the distribution server 2, the segment file that is to be reproduced third, the control unit 380 of the video image reproduction device 3 makes the storage unit 390 store the received segment file (steps S366 and S367).

Thereafter, the control unit 380 of the video image reproduction device 3 repeats the process of obtaining the following files from the distribution server 2 so as to make the storage unit 390 store them.

Meanwhile, slightly before the termination of the reproduction of the head file as illustrated in FIG. 24B, the reproduction process unit 350 having started the reproduction of the head file in step S349 reads from the storage unit 390 the segment file that is to be reproduced second. Thereafter, the reproduction process unit 350 starts the reproduction of the next file at the same time as the termination of the reproduction of the head file.

Thereafter, the reproduction process unit 350 of the video image reproduction device 3 repeats the reproduction process on segment files read from the storage unit 390 and the processes of reading from the storage unit 390 segment files that are to be reproduced next slightly before the termination of the reproduction process.

As described above, according to the video image distribution system 1 of the present embodiment, the distribution server 2 that conducted a scene search in accordance with a search request from the video image reproduction device 3 reads in advance the segment file of the head of the scene corresponding to the search result. Also, regarding video image data stored in the video image data storage unit 260 of the distribution server 2, the time length of the segment file including the head of a scene is reduced so as to reduce the data amount as illustrated in FIG. 2. This makes it possible for the distribution server 2 to transmit to the video image reproduction device 3 the segment file of the head of a scene of a specified video image in a short period of time in a case when the video image (scene) to be reproduced on the basis of a search result is specified in the video image reproduction device 3. Accordingly, the present embodiment can greatly reduce a waiting time between the specifying of a video image that is to be reproduced in the video image reproduction device 3 and the start of the reproduction.

Also, the distribution server 2 transmits to the video image reproduction device 3 a prescribed number of segment files which include a head file and each of which has a short time length. When a sufficient margin has been secured in the video image reproduction device 3, the distribution server 2 transmits a segment file having a long time length. This can suppress an increase in the transfer frequency of segment files between the distribution server 2 and the video image reproduction devices 3 so as to suppress an increase in the process loads on the distribution server 2.

The functional configuration of the distribution server 2 illustrated in FIG. 20 is just exemplary, and some of the constituents may be changed and other constituents may be added as needed. Also, the video image data storage unit 260 for example may be provided in a server separate from the distribution server 2.

Note that the search process illustrated in FIG. 23 is just exemplary, and regarding the search process of the video image distribution system 1 according to the present embodiment, the order and contents of some of the processes in the search process illustrated in FIG. 23 may be changed and other processes may be added to the search process in FIG. 23 as needed.

Also, the reproduction process of a video image illustrated in FIG. 24A and FIG. 24B is just exemplary, and regarding the reproduction process of the video image distribution system 1 according to the present embodiment, the order and contents of some of the processes in the reproduction process in FIG. 24A and FIG. 24B may be changed as needed. Also, the reproduction process of the video image distribution system 1 according to the present embodiment may be a process that is a result of adding other processes to the reproduction process illustrated in FIG. 24A and FIG. 24B.

As described above, in the video image distribution system 1 according to the respective embodiments described above, when the operator of the video image reproduction device 3 conducts a scene search for a video image, the segment file including the head of the scene identified by the search result (scene information) is read from the video image data storage unit 260. Accordingly, when a video image that is to be reproduced on the basis of a search result is specified in the video image reproduction device 3, the reproduction is started from the segment file that has been read, making it possible to omit the process of reading a segment file from the video image data storage unit 260. This can reduce a waiting time between the specifying of a video image that is to be reproduced in the video image reproduction device 3 and the start of the reproduction.

Also, the distribution server 2 first transmits to the video image reproduction device 3 a prescribed number of segment files which include a head file and each of which includes a short time length, and when a sufficient margin has been secured in the video image reproduction device 3, a segment file having a long time length is transmitted. This can suppress an increase in the transfer frequency of segment files between the distribution server 2 and the video image reproduction device 3 so as to suppress an increase in the process loads on the distribution server 2.

This makes it possible for the video image distribution system 1 of the above respective embodiments both to reduce a waiting time before the start of the reproduction in the video image reproduction device 3 and to suppress an increase in the loads on the distribution server 2.

Note that the distribution server 2 and the video image reproduction devices 3 in the video image distribution system 1 above are respectively realized by computers and prescribed programs that are executed by the computers. By referring to FIG. 25, explanations will be given for a hardware configuration of a computer that can be operated as the distribution server 2 and the video image reproduction devices 3.

Figure 25:
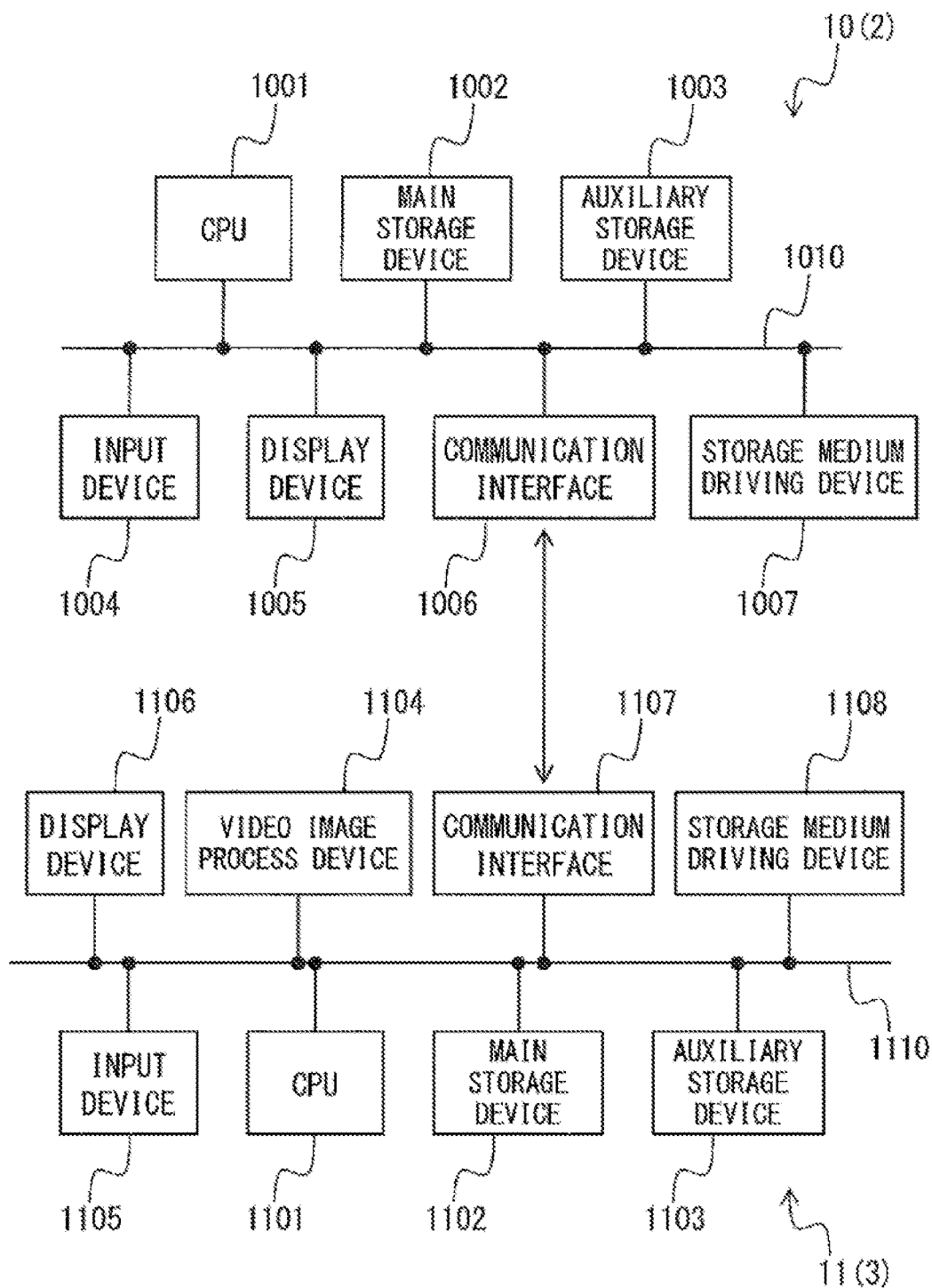
FIG. 25 illustrates a hardware configuration of a computer.

FIG. 25 illustrates a hardware configuration of a computer.

As illustrated in FIG. 25, a computer 10 operated as the distribution server 2 includes a central processing unit (CPU) 1001, a main storage device 1002, an auxiliary storage device 1003, an input device 1004 and a display device 1005. Also, the computer 10 includes a communication interface 1006 and a storage medium driving device 1007. The above hardware constituents in the computer 10 are connected to each other via a bus 1010 so that data can be transmitted between two arbitrary points.

The CPU 1001 is an arithmetic process device that controls the overall operations of the computer 10 by executing various types of programs.

The main storage device 1002 includes a read only memory (ROM) and a random access memory (RAM). The ROM has recorded in advance for example a prescribed basic control program read by the CPU 1001 upon the activation of the computer 10. Also, the RAM is used as a working storage area as needed when the CPU 1001 executes various types of programs. The RAM of the main storage device 1002 can be used for storing for example information for identifying the video image reproduction device 3 connected to the computer 10, information indicating video image data being distributed to the video image reproduction device 3 and other types of information.

The auxiliary storage device 1003 is a storage device, such as a hard disk drive (HDD) etc., having a capacity larger than that of the main storage device 1002. The auxiliary storage device 1003 stores various types of data including a web page, scene information, a playlist, video image data to be distributed, and various types of programs executed by the CPU 1001. The CPU 1001 reads and executes a program stored in the auxiliary storage device 1003 and reads various types of data stored in the auxiliary storage device 1003 as needed. Also, the CPU 1001 reads scene information, a playlist and video image data (segment files) stored in the auxiliary storage device 1003 so as to transfer them to the video image reproduction device 3 in response to a request from the video image reproduction device 3.

The input device 1004 is for example a keyboard device and a mouse device, and in response to a manipulation by the operator of the computer 10, transmits input information associated with the manipulation to the CPU 1001.

The display device 1005 is for example a liquid crystal display, and displays various types of texts and video images in accordance with display data transmitted from the CPU 1001.

The communication interface 1006 connects the computer 10 and the communication network 4 such as the Internet etc. so as to permit communications, and communicates with the video image reproduction devices 3 etc. Also, the communication interface 1006 communicates with other computers etc. that generate for example a segment file group described above.

The storage medium driving device 1007 reads a program or data recorded in a portable recording medium (not illustrated) and records, in a portable recording medium, data etc. that is held by the auxiliary storage device 1003. For the portable recording medium, for example a flash memory provided with a connector compatible with the universal serial bus (USB) standard can be used. Also, for the portable recording medium, a compact disc read only memory (CD-ROM), a digital versatile disc read only memory (DVD-ROM), etc. can also be used.

The computer 10 makes the CPU 1001, the main storage device 1002, the auxiliary storage device 1003, etc. function in cooperation according to a prescribed video image distribution program so as to conduct a scene search for a video image and distribution of video image data (segment file group). When the computer 10 is operated as the distribution server 2 according to the second embodiment, the computer 10 reads in advance the segment file including the head of the scene identified by a search result (scene information) when the result of the scene search for a video image is to be transmitted to the video image reproduction device 3.

A computer 11 that is operated as the video image reproduction device 3 includes a CPU 1101, a main storage device 1102, an auxiliary storage device 1103, a video image process device 1104, an input device 1105 and a display device 1106. Also, the computer 11 includes a communication interface 1107 and a storage medium driving device 1108. The above hardware constituents in the computer 11 are connected to each other via a bus 1110 and data can be transmitted between two arbitrary points.

The CPU 1101 is an arithmetic process device that controls overall operations of the computer 11 by executing various types of programs.

The main storage device 1102 includes a ROM and a RAM. The ROM stores in advance for example a prescribed basic control program etc. that is read by the CPU 1101 upon the activation of the computer 11. Also, the RAM is used as a working storage area as needed when the CPU 1101 executes various programs. The RAM of the main storage device 1102 can be used for storing for example a web page, scene information, a segment file including the head of a scene, etc. obtained from the distribution server 2.

The auxiliary storage device 1103 is a storage device, such as a hard disk drive (HDD) or a solid state drive (SSD), having a capacity larger than that of the main storage device 1102. Various types of programs executed by the CPU 1101 and various types of data are stored in the auxiliary storage device 1103. The CPU 1101 reads and executes a program stored in the auxiliary storage device 1103 and also reads, as needed, various types of data stored in the auxiliary storage device 1103. The auxiliary storage device 1103 can be used for temporarily storing (holding) for example following segment files for reproducing a video image specified on the basis of a search result.

The video image process device 1104 performs a reproduction process of video image data (segment files) obtained from the distribution server 2. Video image data is in a state in which it is encoded (compressed) in a format defined by for example the Moving Picture Experts Group (MPEG). The video image process device 1104 decodes this encoded video image data (segment files) so as to convert it into a reproduced signal that can be displayed in the display device 1106.

The input device 1105 is for example a keyboard device or a mouse device, and transmits, when manipulated by the operator of the computer 11, input information associated with the manipulation to the CPU 1101. When the computer 11 is a tablet computer, a touch panel disposed on the display surface of the display device 1106 for example can be used as the input device 1105.

The display device 1106 is for example a liquid crystal display, and displays various types of texts, video images, etc. in accordance with a reproduced signal (display data) transmitted from the CPU 1101 or the video image process device 1104.

The communication interface 1107 connects the computer 11 and the communication network 4 such as the Internet etc. so that communications are possible between them, and thereby communicates with the distribution server 2 etc.

The storage medium driving device 1108 reads a program or data recorded in a portable recording medium (not illustrated), and records in a portable recording medium data etc. that is held by the auxiliary storage device 1103. For the portable recording medium, for example a flash memory provided with a connector compatible with the universal serial bus (USE) standard can be used. When the computer 11 is provided with an optical disk drive that can be used as a storage medium driving device, a CD-ROM, a DVD-ROM, etc. can also be used as the portable recording medium.

The computer 11 makes the CPU 1101, the main storage device 1102, the auxiliary storage device 1103, the video image process device 1104, etc. function in cooperation according to a prescribed video image distribution program so as to perform the above search process and reproduction process with the distribution server 2. When the computer 11 is operated as the video image reproduction device 3 according to the first embodiment, the computer 11 executes a video image distribution program of obtaining from the distribution server 2 a segment file including the head of a scene identified by a search result (scene information) obtained from the distribution server 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A video image distribution server comprising:
   a memory configured to store a plurality of types of video image data and information on the plurality of types of video image data, each of the plurality of types of video image data representing a single video, each of the plurality of types of video image data being divided into a plurality of segment files, each of the plurality of segment files having a first time length, the plurality of segment files including at least one head segment file that is divided into a plurality of second segment files, and each of the plurality of second segment files having a second time length shorter than the first time length;

a communication interface configured to be connected to a communication network so as to communicate with a video image reproduction device; and a processor configured to
- control the communication interface so that the communication interface receives a search request from the video image reproduction device,
- extract, from among the plurality of types of video image data, information that meets a search condition included in the search request,
- control the communication interface so that the communication interface transmits the extracted information to the video image reproduction device,
- control the communication interface so that the communication interface receives from the video image reproduction device a transfer request including specification information, the specification information including a specified segment file that is to be reproduced from among the plurality of segment files and a URL of the specified segment file,
- obtain, before receiving the transfer request, from the memory the at least one head segment file corresponding to a reproduction starting portion in at least one of the plurality of types of video image data that meets the search condition,
- make, before receiving the transfer request, the memory store the at least one head segment file together with the extracted information,
- read, from the memory and when receiving the transfer request, the specified segment file identified in the specification information included in the transfer request,
- control the communication interface so that the communication interface transmits to the video image reproduction device the specified segment file read from the memory,
- obtain the plurality of second segment files for the at least one head segment file corresponding to the specified segment file,
- during reproduction by the video image reproduction device of the at least one head segment file corresponding to the specified segment file, identify a next segment file having the first time length from among the plurality of segment files following the specified segment file, the next segment file not being divided into the plurality of second segment files,
- obtain the next segment file after a margin between a time of day of completion of reception of the plurality of second segment files and a time of day of completion of reproduction of the plurality of second segment files, the margin increasing when a transfer time rate for obtaining the plurality of second segment files is faster than a reproduction rate for the plurality of second segment files, the transfer time rate for obtaining one of the plurality of second segment files being faster than a transfer time rate for obtaining the next segment file, and the transfer time rate for obtaining the next segment file being within the margin.

2. The video image distribution server according to claim 1, wherein a plurality of scenes are set for each of the plurality of types of video image data, and the plurality of segment files includes the at least one head segment file for each of the plurality of scenes.

3. The video image distribution server according to claim 2, wherein the specified segment file corresponds to the at least one head segment file for at least one of the plurality of scenes.

4. A method of distributing video image data, the method comprising:
- controlling, by using a computer, a communication interface so that the communication interface receives a search request from a video image reproduction device, the communication interface being connected to a communication network so as to communicate with the video image reproduction device;
- searching, by using the computer, a memory which stores a plurality of types of video image data for at least one of the plurality of types of video image data that meets a search condition included in the search request, each of the plurality of types of video image data representing a single video, each of the plurality of types of video image data being divided into a plurality of segment files, each of the plurality of segment files having a first time length, the plurality of segment files including at least one head segment file that is divided into a plurality of second segment files, and each of the plurality of second segment files having a second time length shorter than the first time length;
- controlling, by using the computer, the communication interface so that the communication interface transmits to the video image reproduction device a search result including information on the at least one of the plurality of types of video image data that meets the search condition;
- controlling, by using the computer, the communication interface so that the communication interface receives a distribution request from the video image reproduction device, the distribution request including specification information, the specification information including a specified segment file that is to be reproduced from among the plurality of segment files and a URL of the specified segment file;
- reading, by using the computer and before receiving the distribution request, the at least one head segment file corresponding to a reproduction starting portion in the at least one of the plurality of types of video image data that meets the search condition from the memory;
- controlling, by using the computer and when receiving the distribution request, the communication interface so that the communication interface transmits the specified segment file read from the memory,.
- obtaining, by using the computer and from the video image reproduction device, the plurality of second segment files for the at least one head segment file corresponding to the specified segment file;
- during reproduction by the video image reproduction device of the at least one head segment file corresponding to the specified segment file, identifying, by using the computer, a next segment file having the first time length from among the plurality of segment files following the specified segment file, the next segment file not being divided into the plurality of second segment files; and
- obtaining the next segment file after a margin between a time of day of completion of reception of the plurality of second segment files and a time of day of completion of reproduction of the plurality of second segment files, the margin increasing when a transfer time rate for obtaining the plurality of second segment files is faster than a reproduction rate for the plurality of second segment files, the transfer time rate for obtaining one of the plurality of second segment files being faster than a transfer time rate for obtaining the next segment file, and the transfer time rate for obtaining the next segment file being within the margin.

5. A non-transitory computer-readable recording medium having stored therein a program for causing a computer to execute a process for distributing video image data, the process comprising:

controlling a communication interface so that the communication interface receives a search request from a video image reproduction device, the communication interface being connected to a communication network so as to communicate with the video image reproduction device;

searching a memory which stores a plurality of types of video image data for at least one of the plurality of types of video image data that meets a search condition included in the search request, each of the plurality of types of video image data representing a single video, each of the plurality of types of video image data being divided into a plurality of segment files, each of the plurality of segment files having a first time length, the plurality of segment files including at least one head segment file that is divided into a plurality of second segment files, and each of the plurality of second segment files having a second time length shorter than the first time length;

controlling the communication interface so that the communication interface transmits to the video image reproduction device a search result including information on the at least one of the plurality of types of video image data that meets the search condition;

controlling the communication interface so that the communication interface receives a distribution request from the video image reproduction device, the distribution request including specification information, the specification information including a specified segment file that is to be reproduced from among the plurality of segment files and a URL of the specified segment file;

reading, before receiving the distribution request, the at least one head segment file corresponding to a reproduction starting portion in the at least one of the plurality of types of video image data that meets the search condition from the memory;

controlling, when receiving the distribution request, the communication interface so that the communication interface transmits the specified segment file read from the memory;

obtaining, from the video image reproduction device, the plurality of second segment files for the at least one head segment file corresponding to the specified segment file;

during reproduction by the video image reproduction device of the at least one head segment file corresponding to the specified segment file, identifying a next segment file having the first time length from among the plurality of segment files following the specified segment file, the next segment file not being divided into the plurality of second segment files; and obtaining the next segment file after a margin between a time of day of completion of reception of the plurality of second segment files and a time of day of completion of reproduction of the plurality of second segment files, the margin increasing when a transfer time rate for obtaining the plurality of second segment files is faster than a reproduction rate for the plurality of second segment files, the transfer time rate for obtaining one of the plurality of second segment files being faster than a transfer time rate for obtaining the next segment file, and the transfer time rate for obtaining the next segment file being within the margin.

* * * * *